(12) United States Patent
Kiribuchi

(10) Patent No.: US 12,362,597 B2
(45) Date of Patent: Jul. 15, 2025

(54) MOTOR AND DRIVER

(71) Applicant: OMRON Corporation, Kyoto (JP)

(72) Inventor: Takeshi Kiribuchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/547,992

(22) PCT Filed: Mar. 1, 2022

(86) PCT No.: PCT/JP2022/008609
§ 371 (c)(1),
(2) Date: Aug. 25, 2023

(87) PCT Pub. No.: WO2022/186199
PCT Pub. Date: Sep. 9, 2022

(65) Prior Publication Data
US 2024/0154461 A1    May 9, 2024

(30) Foreign Application Priority Data

Mar. 4, 2021   (JP) .................................. 2021-034684
Dec. 10, 2021  (JP) .................................. 2021-200829

(51) Int. Cl.
*H02J 50/10*     (2016.01)
*H02J 7/14*      (2006.01)
(Continued)

(52) U.S. Cl.
CPC ................ *H02J 50/10* (2016.02); *H02J 7/14* (2013.01); *H02K 11/20* (2016.01); *H02P 21/50* (2016.02); *H02P 27/06* (2013.01)

(58) Field of Classification Search
CPC . H02J 50/10; H02J 7/14; H02K 11/20; H02K 11/0094; H02K 3/28; H02K 11/21; H02P 21/50; H02P 27/06; H02P 6/16
(Continued)

(56) References Cited

U.S. PATENT DOCUMENTS 10,784,805 B1 *   9/2020   Bojoi ..................... H02P 21/22
2002/0190675 A1 * 12/2002  Boscolo .................. H02P 6/14
                                                       318/400.01
(Continued)

FOREIGN PATENT DOCUMENTS

JP   H08251817 A    9/1996
JP   2001297389 A   10/2001
(Continued)

OTHER PUBLICATIONS

International Search Report issued in Intl. Appln. No. PCT/JP2022/008609, mailed May 10, 2022. English translation provided.
(Continued)

*Primary Examiner* — Richard Tan
(74) *Attorney, Agent, or Firm* — ROSSI, KIMMS & McDOWELL LLP

(57) ABSTRACT

A motor receives power from a driver external to the motor through a power line. The motor includes an extractor that extracts a part of power supplied from the driver to the motor, and a supply unit that supplies the power extracted by the extractor to an external device. This structure allows stable power supply to the external device associated with the motor.

8 Claims, 18 Drawing Sheets

(51) Int. Cl.
*H02K 11/20* (2016.01)
*H02P 21/00* (2016.01)
*H02P 27/06* (2006.01)

(58) Field of Classification Search
USPC .......................................................... 307/104
See application file for complete search history.

(56) References Cited

U.S. PATENT DOCUMENTS

| | | | | |
|---|---|---|---|---|
| 2011/0241591 | A1* | 10/2011 | Meynrd | H02K 19/34 363/71 |
| 2020/0268408 | A1* | 8/2020 | Faller | A61B 18/04 |
| 2024/0223113 | A1* | 7/2024 | Kiribuchi | H02P 21/06 |

FOREIGN PATENT DOCUMENTS

| | | |
|---|---|---|
| JP | 2002136057 A | 5/2002 |
| JP | 2002197581 A | 7/2002 |
| JP | 2008220094 A | 9/2008 |
| JP | 2016045951 A | 4/2016 |
| JP | 2021027659 A | 2/2021 |
| WO | WO-2019163000 A1 * | 8/2019 |

OTHER PUBLICATIONS

Written Opinion issued in Intl. Appln. No. PCT/JP2022/008609, mailed May 10, 2022. English translation provided.

International Search Report issued in Intl. Appln. No. PCT/JP2022/008610, mailed May 10, 2022. English translation provided.

Written Opinion issued in Intl. Appln. No. PCT/JP2022/008610, mailed May 10, 2022. English translation provided.

Kiribuchi. Copending U.S. Appl. No. 18/548,001, filed Aug. 25, 2023 (a copy is not included because the cited application is not yet available to the public and the Examiner has ready access to the cited application).

* cited by examiner

MOTOR AND DRIVER

FIELD

The present invention relates to a motor and a driver.

BACKGROUND

Motors are to be controlled accurately to drive loads for various uses. To achieve this, the states of the motors are determined typically using detectors such as encoders. Encoders are driven with power that can typically be supplied through cables connecting the encoders and servo systems (e.g., drivers). In another example, Patent Literature 1 describes an encoder that receives power from a power supply other than a servo system. More specifically, Patent Literature 1 describes an auxiliary power supply for the encoder that operates when the power supplied to the encoder from the system is reduced for some reason.

As another example of power supply to encoders, Patent Literature 2 describes an encoder that wirelessly communicates with a servo system using power externally supplied wirelessly. Further, Patent Literature 3 describes an encoder that wirelessly communicates with a servo system using power externally supplied with a wire.

CITATION LIST

Patent Literature

Patent Literature 1: Japanese Unexamined Patent Application Publication No. 8-251817
Patent Literature 2: Japanese Unexamined Patent Application Publication No. 2001-297389
Patent Literature 3: Japanese Unexamined Patent Application Publication No. 2002-197581

SUMMARY

Technical Problem

An encoder attached to a motor is to receive stable power to constantly monitor the state of the motor to be driven, although the encoder consumes lower power than the motor. Power is supplied to the encoder typically through a cable connected to a driver for the motor. However, this involves cabling for the encoder in addition to installing power lines for the motor, possibly increasing the workload and the cost for cabling.

Techniques have been developed for supplying power wirelessly to encoders, but can be unpractical. A motor is typically incorporated in equipment as a power source for a drive axis in the equipment. In such equipment, the encoder can receive power much less efficiently in a wireless manner than in a wired manner, with the encoder at a distance from a wireless transmission device (antenna). For equipment being a movable machine (e.g., a robot), the encoder cannot reliably receive stable power when obstacles interfere with wireless power transmission or when the machine is positioned or oriented in a certain manner. Such equipment includes various devices that use power around the motor, such as sensors.

In response to the above issue, one or more aspects of the present invention are directed to a technique for stable power supply to an external device associated with a motor.

Solution to Problem

A motor according to one aspect of the present invention receives power from a driver external to the motor through a power line. The motor includes an extractor that extracts a part of power supplied from the driver to the motor, and a supply unit that supplies the power extracted by the extractor to an external device. The above motor may be either a single-phase alternating current (AC) motor or a three-phase AC motor. The coils in a winding unit in the motor may be either delta-connected or star-connected (or Y-connected). The coils in the winding unit may be wound around a stator in the motor with either distributed winding or concentrated winding. In other words, the motor according to one or more aspects of the present invention may include a winding unit with any structure. The above motor may further include a power input unit that allows power from the driver through the power line to be input into a winding unit in the motor. In this case, the extractor may extract a part of power in the winding unit. In another aspect, the extractor may extract a part of power in the power line.

The above motor may further include a transformer located in the winding unit. The transformer may include a primary coil to receive a part of power in the winding unit. The extractor may extract a part of the power in the winding unit using the transformer. In the motor with this structure, the extractor uses the transformer located in the winding unit in the motor and extracts, as power for the external device, a part of the driving power supplied to the motor through the power line. The transformer is located in the motor to receive, at its primary coil, a part of the AC flowing through the winding unit. The transformer may be either an autotransformer or a two-winding transformer. In an autotransformer, the primary coil includes a portion that also serves as a secondary coil. In a typical motor including coils wound around the stator core, the coils protrude from the stator core by a certain distance at the coil end. The transformer may thus be located in the winding unit at the coil end. In another aspect, the secondary coil in the transformer may be wound around the stator core together with the coils in the motor.

The AC extracted from the secondary coil in the transformer is determined based on the AC flowing through the primary coil and on the ratio of turns of the transformer (the ratio of the number of turns of the secondary coil to the number of turns of the primary coil). The supply unit rectifies the extracted AC and supplies the AC to the external device. The supply unit may transform, as appropriate, the voltage resulting from rectification to a voltage appropriate for driving the external device. The supply unit may also include a secondary battery that stores power resulting from rectification. This allows more stable power supply to the external device.

The motor with the above structure extracts, as power for the external device, a part of the power supplied to the motor through the power line, and supplies the extracted power to the external device. This allows stable power supply to the external device independently of the position and the orientation of the motor. The structure also eliminates cabling for power supply to the external device, thus greatly reducing the workload. The external device may be an encoder attached to the motor. In another aspect, the external device may be a temperature sensor, a vibration sensor, or another sensor located inside or outside the motor.

Specific aspects of the transformer in the above motor will now be described. In a first aspect, the transformer may include the primary coil connected in series to a winding portion for at least one phase of one or more phases included in the winding unit, and a secondary coil connected to the supply unit. In a second aspect, the transformer may include the primary coil connected in parallel to a winding portion for at least one phase of one or more phases included in the winding unit, and a secondary coil connected to the supply unit. In a third aspect, the transformer may include the primary coil being a winding portion for at least one phase of one or more phases included in the winding unit, and a secondary coil wound together with the winding portion in the motor and connected to the supply unit. The transformer may have any structure other than the structures in the above aspects.

The above motor may eliminate the above transformer. In this case, the extractor may be located in parallel to a winding portion for at least one phase of one or more phases included in the winding unit, and also connected to the supply unit. The extractor in this aspect extracts, as power for the encoder, a part of the power in the winding portion directly from the winding portion, or in other words, without using the transformer. This structure also allows stable power supply to the encoder and eliminates cabling for power supply to the encoder, thus greatly reducing the workload.

Any of the above motors may further include a signal exchanger that causes a predetermined signal to be transmitted or received between the winding unit and the encoder using the transformer. This structure uses the operation of the transformer also to transmit or receive the predetermined signal between the encoder and the winding unit in the motor. This allows communication between the encoder and the external driver through the transmission or reception of the predetermined signal using the signal exchanger, with the winding unit in the motor being connected to the driver through the power line.

One or more aspects of the present invention may be directed to a driver that supplies a driving current to any of the above motors. The driver may calculate the power supplied by the supply unit. In response to the calculated power being lower than a threshold associated with driving power for the encoder, the driver may increase the power to be supplied to the motor by increasing the d-axis current value in the driving current for the motor. For the motor being driven and controlled, the d-axis current does not contribute to the torque of the motor, specifically in an area with a lower driving current for the motor. In this lower-current area, the extractor extracts lower power that can be insufficient to drive the encoder. The d-axis current value is increased in the driving current for the motor when the power supplied to the encoder is estimated to be lower than the threshold, allowing sufficient power supply to the encoder without greatly affecting the motor operation.

In another aspect of the present invention, when the motor is stopped, the driver may supply power to the motor by controlling the q-axis current value at a constant value that causes the motor to stop and by controlling the d-axis current value to vary over time. This structure allows sufficient power supply to the encoder when the motor is stopped or is to be stopped. In this case, the d-axis current value may vary as, for example, a sine wave, a square wave, or a triangular wave.

In another aspect of the present invention, the driver may include an inverter circuit connected to the winding unit to supply the driving current to the winding unit, and a superimposition unit connected to the winding unit to be in parallel to the inverter circuit to superimpose power on the driving current flowing through the winding unit. This structure allows AC power appropriate for the external device to be transmitted to the winding unit in the motor.

One or more aspects of the present invention may further be directed to a driver that supplies driving power to a motor including an extractor that extracts a part of externally supplied power and a supply unit that supplies the power extracted by the extractor to an external device. Any of the technical ideas described above may be applicable to the motor. The driver may include an output unit that outputs, to the motor, driving power for the motor on which first power to be supplied to the external device is superimposed. In this case, the output unit may adjust the first power to be superimposed by controlling the d-axis current value in the driving current for the motor. The output unit may generate the first power by controlling the d-axis current value and the q-axis current value in the driving current for the motor. In one or more aspects of the present disclosure, the control of the d-axis current value and the q-axis current value includes an increase and a decrease of these values. The first power to be superimposed may be adjusted by combining an increase and a decrease of the d-axis current value and the q-axis current value as appropriate for the type of the motor (e.g., a surface permanent magnet motor or an SPM, or an internal permanent magnet or an IPM). The driver with this structure can supply power to the external device using the extractor and the supply unit at the same time as supplying driving power to the motor. This simplifies the structure of, for example, the power supply and power cables for the external device.

In the above driver, the output unit may generate the first power by controlling the d-axis current value within an allowable range of a current to be output from the driver to the motor. The d-axis current may be controlled in this manner to achieve both stable drive of the motor and appropriate power supply to the external device.

In the above driver, the output unit may control the d-axis current value in the driving current for the motor based on a rotational speed of the motor. The efficiency of power extraction performed by the extractor in the motor can depend on the electrical angular frequency of the driving current, which is associated with the rotational speed of the motor. When the extractor uses the above transformer to extract power, for example, the extraction efficiency tends to be higher for the driving current having a higher electrical angular frequency. The output unit can reflect such power extraction characteristics in controlling the d-axis current value to achieve appropriate power supply to the external device.

For example, in response to the rotational speed of the motor being higher than a predetermined threshold, the output unit may generate the first power by controlling the d-axis current value not to vary over time, and superimpose the first power on the driving power for the motor. The predetermined threshold is the rotational speed of the motor corresponding to the electrical angular frequency of the driving current that causes the extractor to extract power at relatively high efficiency. When the rotational speed of the motor is higher than the predetermined threshold, the extractor is expected to extract power at relatively high efficiency. In this case, the d-axis current value may be controlled not to vary over time.

In response to the rotational speed of the motor being less than or equal to a predetermined threshold, the extractor is not expected to extract power at high efficiency. In this case, the output unit may generate the first power by controlling the d-axis current value to vary over time, and superimpose the first power on the driving power for the motor. To control the d-axis current value to vary over time, for example, the output unit may cause the d-axis current value to vary at a frequency higher than an electrical angular frequency corresponding to the rotational speed of the motor. The d-axis current value may vary over time as, for example, a sine wave, a square wave, or a triangular wave.

In the above driver, in response to the power supplied by the supply unit being lower than a threshold associated with driving power for the external device, the output unit may generate the first power by controlling the d-axis current value in the driving current for the motor, and output the first power to the motor.

In the above driver, when the motor is stopped, the output unit may generate the first power by controlling the q-axis current value at a constant value that causes the motor to stop and by controlling the d-axis current value to vary over time, and output the first power to the motor. This structure can appropriately supply power to the external device using the extractor and the supply unit when the motor is stopped or is to be stopped.

In any of the above drivers, the output unit may perform feedback control of the d-axis current value based on the power extracted by the extractor in the motor and based on power to be supplied to the external device. This structure allows more appropriate power supply to the external device using the extractor and the supply unit in the motor.

Advantageous Effects

The technique achieves stable power supply to the external device associated with the motor.

DETAILED DESCRIPTION

First Embodiment

Figure 1:
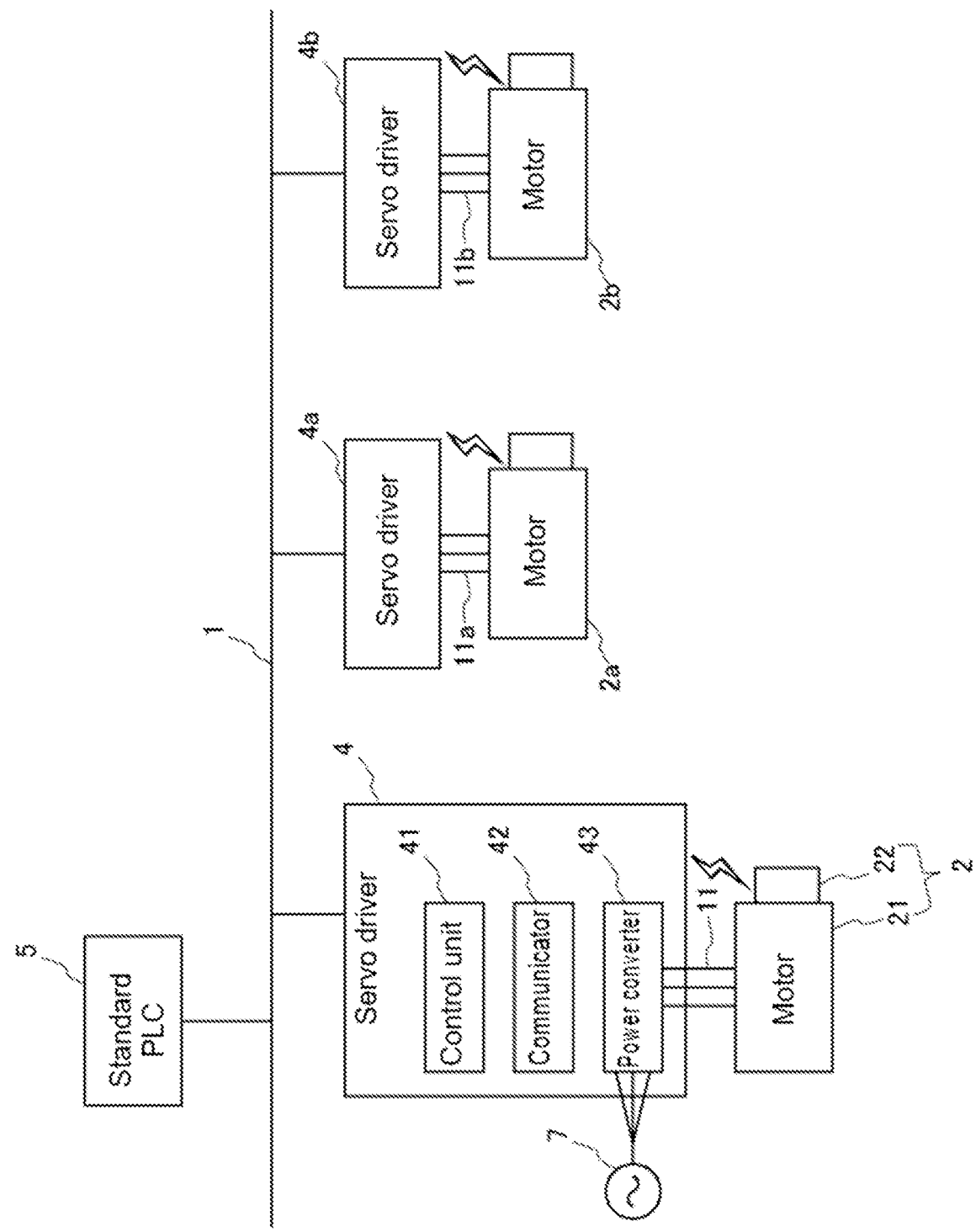
FIG. 1 is a schematic diagram of a control system for driving and controlling motors.

FIG. 1 is a schematic diagram of a control system for driving and controlling motors. The control system will now be described. The control system includes a programmable logic controller (PLC) 5 as a host controller connected to a network 1. The network 1 is connected to multiple servo drivers 4 that can transmit or receive signals to or from the PLC 5. Although FIG. 1 shows the functional components of a servo driver 4 in detail as a typical example, other servo drivers 4a and 4b also include functional components equivalent to those of the servo driver 4. A motor 2 is connected to the servo driver 4 with a power line 11 and receives driving power from the servo driver 4. Similarly, a motor 2a receives driving power from the servo driver 4a through a power line 11a. A motor 2b receives driving power from the servo driver 4b through a power line 11b. The structures of the motor and the servo driver are described below with reference to the motor 2 and the servo driver 4 as typical examples.

The motor 2 is driven and controlled in accordance with commands from the PLC 5 to drive a predetermined load device. Examples of the load device include various machines (e.g., industrial robotic arms and conveyors). The motor 2 is incorporated in the load device as an actuator for driving the load device. The motor 2 is an AC servo motor. In another embodiment, the motor 2 may be an induction motor or a direct current (DC) motor. The motor 2 includes a motor body 21 and an encoder 22. The motor body 21 includes a stator and a rotor. The stator includes a winding unit including a stator core and coils wound around the stator core. The rotor incorporates permanent magnets. The encoder 22 includes a detection disk rotatable as the rotor rotates to detect the rotation of the rotor. The encoder 22 may detect the rotation in an incremental manner or an absolute manner.

The detection signal from the encoder 22 is transmitted wirelessly to the servo driver 4 through a communicator 42 (described later) included in the servo driver 4. The transmitted detection signal is used for servo control in a control unit 41 (described later) included in the servo driver 4. The detection signal from the encoder 22 includes, for example, positional information about the rotational position (angle) of the rotational axis of the motor 2 and information about the rotational speed of the rotational axis.

The servo driver 4 includes the control unit 41, the communicator 42, and a power converter 43. The control unit 41 is a functional unit for performing servo control of the motor 2 based on commands from the PLC 5. The control unit 41 receives motion command signals about the motion of the motor 2 from the PLC 5 with the network 1, and receives detection signals from the encoder 22. The control unit 41 then performs servo control for driving the motor 2, or specifically, calculates command values about the motion of the motor 2. The control unit 41 performs, for example, feedback control using a position controller, a speed controller, and a current controller. The control unit 41 also performs control in the servo driver 4 other than the servo control of the motor 2.

The communicator 42 is a functional unit for performing wireless communication between the encoder 22 and the servo driver 4. To start wireless communication, the communicator 42 in the servo driver 4 identifies its communication target encoder, thus identifying the encoder 22 as a target of wireless communication. Thus, the communicator 42 performs wireless communication with the target encoder without crosstalk with the encoder in the motor 2a or with the encoder in the motor 2b. Similarly, the encoder in the motor 2a performs wireless communication with the servo driver 4a alone, and the encoder in the motor 2b performs wireless communication with the servo driver 4b alone. The power converter 43 supplies driving power to the motor 2 through the power line 11 based on the command value about the motion of the motor 2 calculated by the control unit 41. The supply power is AC power from an AC power supply 7 to the servo driver 4. Although the servo driver 4 receives a three-phase AC in the present embodiment, the servo driver 4 may receive a single-phase AC. In another embodiment, the servo driver 4 may receive a DC.

Figure 2:
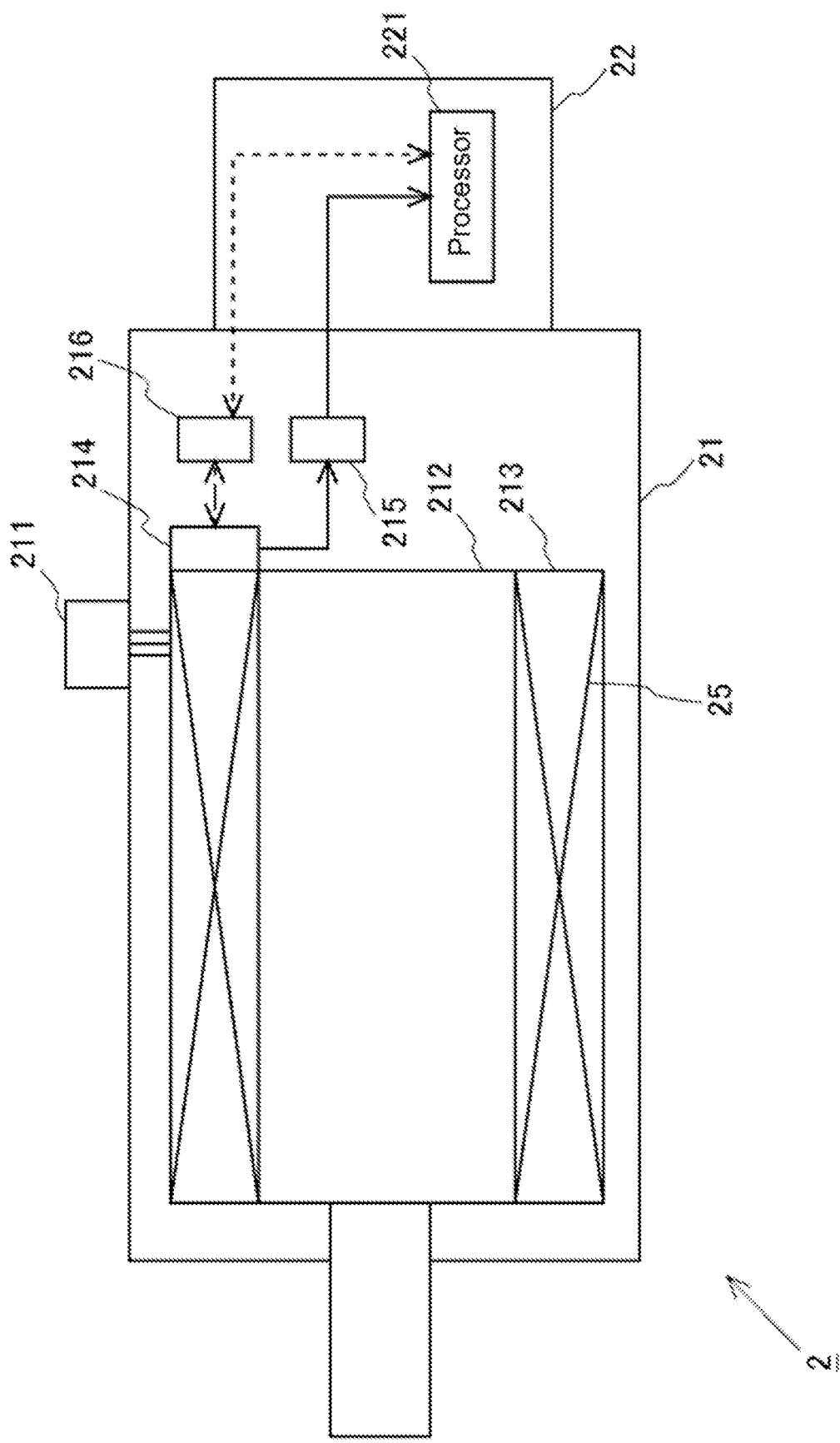
FIG. 2 is a schematic diagram of a motor.

The schematic structure of the motor 2 will now be described with reference to FIG. 2. The motor 2 is a three-phase (U phase, V phase, and W phase) AC motor and includes the motor body 21 and the encoder 22. The motor body 21 includes a rotor 212 and a stator 213. The rotor 212 incorporates permanent magnets and is supported in a rotatable manner. The stator 213 includes a winding unit 25 including the stator core formed from magnetic steel and the coils wound around the stator core. In the winding unit 25 in the present embodiment, the winding portions for the respective phases are Y-connected, but the winding portions may be delta-connected instead. The coils may be wound around the stator core with either distributed winding or concentrated winding in the present embodiment. The structure shown in FIG. 2 is schematic. The technical concept of the present invention is applicable to a motor with any structure.

Figure 3:
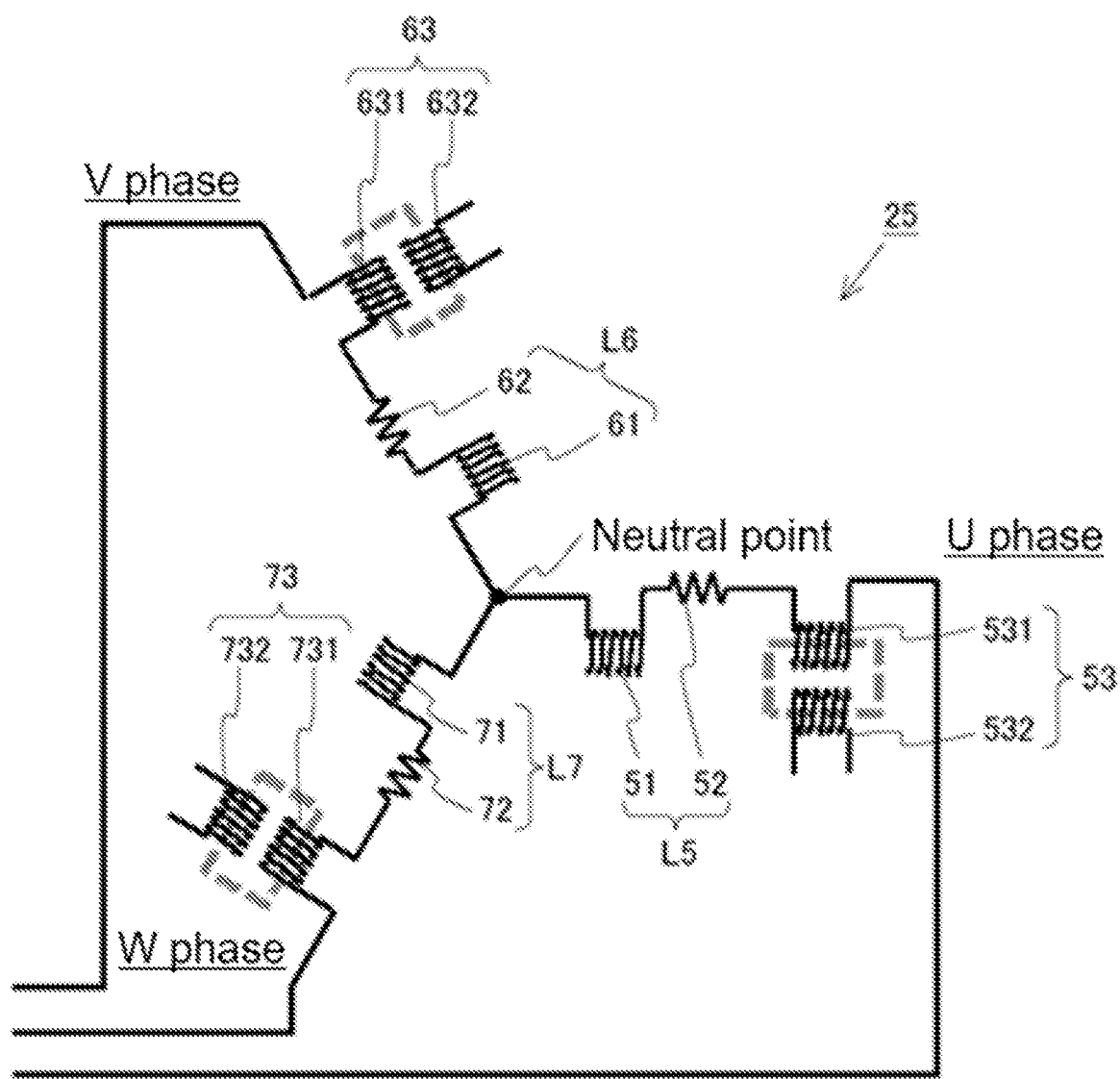
FIG. 3 is a first schematic diagram of a winding unit in the motor and transformers located in the winding unit.
Figure 4:
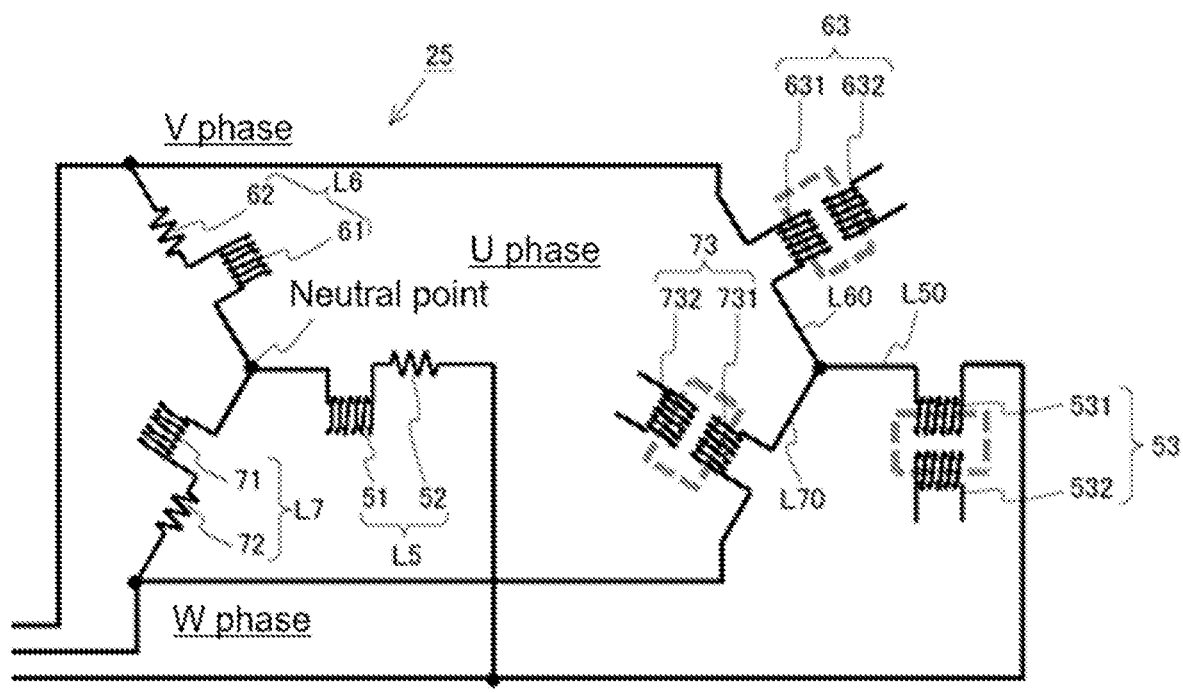
FIG. 4 is a second schematic diagram of a winding unit in the motor and transformers located in the winding unit.
Figure 5:
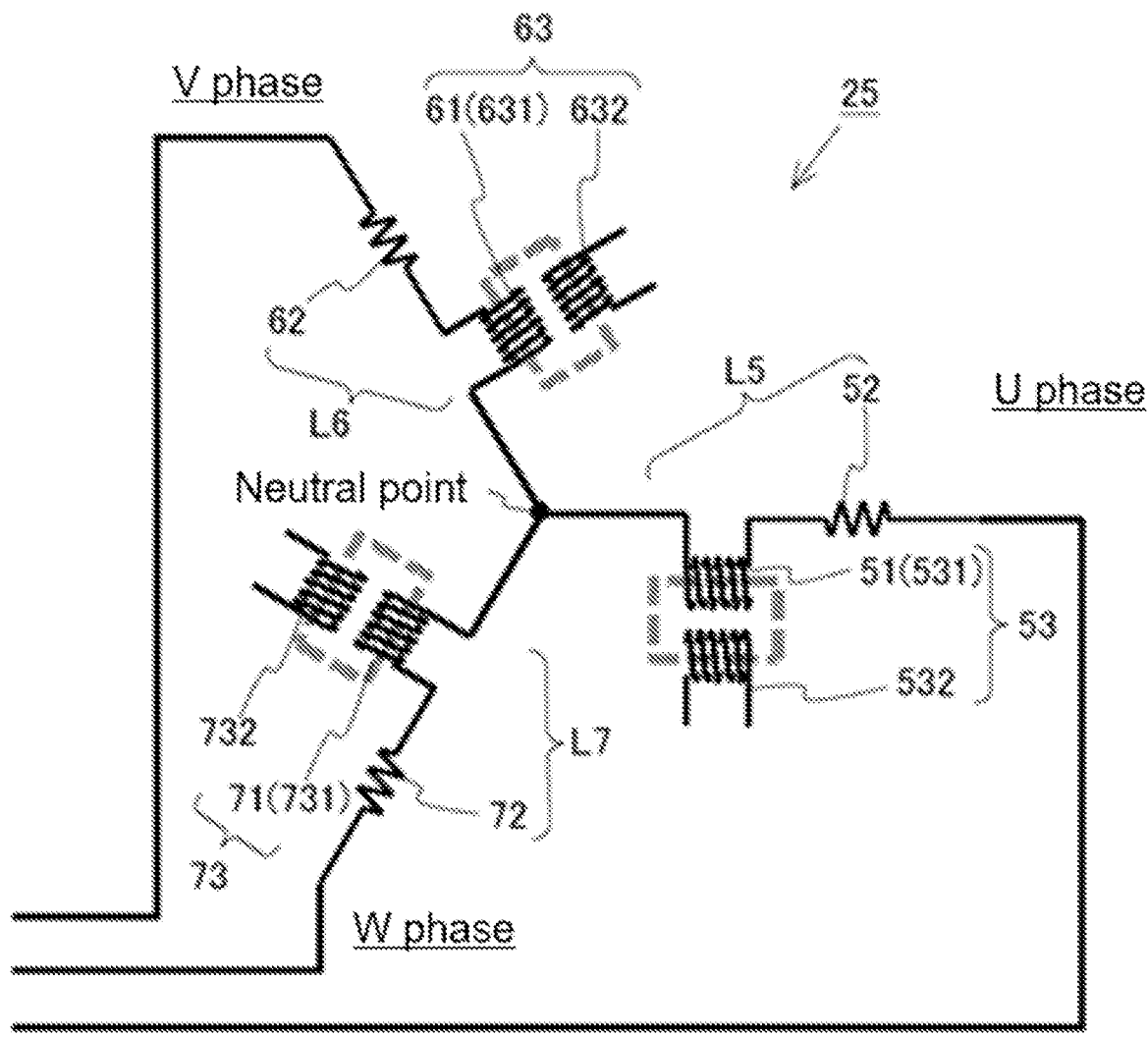
FIG. 5 is a third schematic diagram of a winding unit in the motor and transformers located in the winding unit.

The power line 11 for supplying driving power from the servo driver 4 is connected to a connector 211. The connector 211 corresponds to a power input unit in one or more aspects of the present invention. The connector 211 is connected to the winding portions for the respective phases in the winding unit 25. The motor 2 includes transformers (refer to 53, 63, and 73 in FIGS. 3 to 5, described in detail later) located in the winding unit 25. The motor 2 also includes an extractor 214 that uses the transformers to extract, as power for the encoder, a part of the driving power supplied to the coils in the winding unit 25. More specifically, the extractor 214 supplies the AC flowing through the winding unit 25 in the motor body 21 to the primary coils in the transformers, and extracts a current at the secondary coils as a driving current for the encoder 22. In the examples of FIGS. 3 and 4, the transformers are located in the winding unit 25 at the coil end in the stator 213. In the example of FIG. 5, the transformers have their primary coils wound around the stator core together with the coils in the winding unit 25. The transformers may be at a position other than the coil end.

The extractor 214 extracts, as power for the encoder 22, the AC power output from the secondary coils in the transformers. The power is rectified by a supply unit 215 and stepped up or down as appropriate into a DC voltage appropriate for driving the encoder 22 using a DC-DC converter included in the supply unit 215. The supply unit 215 is electrically connectable to the encoder 22 attached to the motor body 21 to supply DC power to the encoder 22, or more specifically, to a processor 221 that detects rotation of the rotor 212. The supply unit 215 may include a secondary battery that can store DC power resulting from rectification. The secondary battery can supply power to the encoder 22 with no or very low driving current flowing through the winding unit 25.

In the motor 2 in the present embodiment, a predetermined signal is transmitted or received between the winding unit 25 in the motor body 21 and the processor 221 in the encoder 22 through the power extraction with the extractor 214. The predetermined signal is transmitted or received with a signal exchanger 216 using the above transformers. To transmit the predetermined signal from the winding unit 25 to the processor 221, a current including the predetermined signal being superimposed is applied to the coils in the winding unit 25 to flow through the primary coils in the transformers. The extractor 214 can thus generate a current corresponding to the predetermined signal at the secondary coils in the transformers. The extracted corresponding current can then be transmitted to the processor 221 with the signal exchanger 216. To accurately transmit information about the predetermined signal, the signal exchanger 216 transmits the predetermined signal without rectifying the corresponding current extracted by the extractor 214. For the extracted corresponding current being weak, the signal exchanger 216 may perform predetermined amplification.

To transmit the predetermined signal from the processor 221 to the winding unit 25, a current including the predetermined signal is applied to the secondary coils in the transformers through the signal exchanger 216. The extractor 214 can thus generate a current corresponding to the predetermined signal at the primary coils in the transformers and cause the current to flow through the coils in the winding unit 25. In this case as well, the signal exchanger 216 may perform predetermined amplification of the predetermined signal. The encoder 22 can transmit the predetermined signal from the processor 221 to the servo driver 4 through a current corresponding to the predetermined signal, with the coils in the winding unit 25 being electrically connected to the servo driver 4 with the power line 11. As described above, the communication between the encoder 22 and the servo driver 4 is performed wirelessly through the communicator 42. The communication of the predetermined signal through the signal exchanger 216 is performed in a manner usable under a predetermined condition, such as before the above wireless communication is enabled.

Example structures of the winding unit 25 in the motor body 21 and the transformers located in the winding unit 25 will now be described. A first example will be described first with reference to FIG. 3. The winding unit 25 includes three-phase winding portions L5, L6, and L7 for the U, V, and W phases. The winding portions for the respective phases are Y-connected and have a connection being a neutral point. In FIG. 3, the U-phase winding portion L5 has an inductance component 51 and a resistance component 52. Similarly, the V-phase winding portion L6 has an inductance component 61 and a resistance component 62. The W-phase winding portion L7 has an inductance component 71 and a resistance component 72.

The structure includes transformers for the respective phases to form the extractor 214. More specifically, for the U phase, the winding portion L5 is connected in series to a primary coil 531 in a U-phase transformer 53. For the V phase, the winding portion L6 is connected in series to a primary coil 631 in a V-phase transformer 63. For the W phase, the winding portion L7 is connected in series to a primary coil 731 in a W-phase transformer 73. A secondary coil 532 in the transformer 53 for the U phase, a secondary coil 632 in the transformer 63 for the V phase, and a secondary coil 732 in the transformer 73 for the W phase are connected to the supply unit 215. The secondary coils 532, 632, and 732 are also connected to the signal exchanger 216.

The transformers for the respective phases basically have the same ratio of turns (the ratio of the number of turns of the secondary coil to the number of turns of the primary coil), but may have different ratios of turns. In the example of FIG. 3, the structure includes transformers for all the three phases, and each transformer has the secondary coil connected to the supply unit 215 and to the signal exchanger 216. In some embodiments, the structure may include one or more transformers for one or two of the three phases, and the transformer(s) may have the secondary coil connected to the supply unit 215 and to the signal exchanger 216. In another embodiment, the structure may include transformers for all the three phases, and one or more of the transformers may have the secondary coil connected to the supply unit 215 with the remaining transformer(s) having the secondary coil connected to the signal exchanger 216. In this case, the transformer(s) connected to the supply unit 215 to supply power to the encoder 22 may have a ratio of turns selected as appropriate. The transformer(s) connected to the signal exchanger 216 to transmit or receive the predetermined signal to or from the encoder 22 may have a ratio of turns selected as appropriate.

The winding unit 25 and the transformers 53, 63, and 73 with the above structure allow the extractor 214 to extract, as the driving power for the encoder 22, a part of the power supplied to the motor 2 through the power line 11. This structure can constantly and stably supply power to the encoder 22 while the motor 2 is being driven. The structure also eliminates cabling for the encoder 22, greatly reducing the work and the cost for cabling. In the first example, the transformer for each phase may be located at the coil end in the stator 213.

A second example will now be described with reference to FIG. 4. The winding unit 25 in the motor body 21 in this example has the same structure as in the first example, and will not be described in detail. In the second example, the winding portion L5 is connected in parallel to the primary coil 531 in the transformer 53 for the U phase. The winding portion L6 is connected in parallel to the primary coil 631 in the transformer 63 for the V phase. The winding portion L7 is connected in parallel to the primary coil 731 in the transformer 73 for the W phase. More specifically, the structure includes a line L50 including the primary coil 531, a line L60 including the primary coil 631, and a line L70 including the primary coil 731. The line L50, the line L60, and the line L70 are Y-connected and have their other ends respectively connected to the winding portion L5 for the U phase, the winding portion L6 for the V phase, and the winding portion L7 for the W phase. The secondary coil 532 in the transformer 53, the secondary coil 632 in the transformer 63 for the V phase, and the secondary coil 732 in the transformer 73 for the W phase are connected to the supply unit 215. The secondary coils 532, 632, and 732 are also connected to the signal exchanger 216.

In the second example as well, the transformers for the respective phases basically have the same ratio of turns, but may have different ratios of turns. In the example of FIG. 4, the structure includes transformers for all the three phases, and each transformer has the secondary coil connected to the supply unit 215 and to the signal exchanger 216. In some embodiments, the structure may include one or more transformers for one or two of the three phases, and the transformer(s) may have the secondary coil connected to the supply unit 215 and to the signal exchanger 216. In another embodiment, the structure may include transformers for all the three phases, and one or more of the transformers may have the secondary coil connected to the supply unit 215 with the remaining transformer(s) having the secondary coil connected to the signal exchanger 216. In this case, the transformer(s) connected to the supply unit 215 to supply power to the encoder 22 may have a ratio of turns selected as appropriate. The transformer(s) connected to the signal exchanger 216 to transmit or receive the predetermined signal to or from the encoder 22 may have a ratio of turns selected as appropriate.

The winding unit 25 and the transformers 53, 63, and 73 with the above structure allow the extractor 214 to extract, as the driving power for the encoder 22, a part of the power supplied to the motor 2 through the power line 11. This structure can constantly and stably supply power to the encoder 22 while the motor 2 is being driven. The structure also eliminates cabling for the encoder 22, greatly reducing the work and the cost for cabling. In the second example as well, the transformer for each phase may be located at the coil end in the stator 213, similarly to the first example.

A third example will now be described with reference to FIG. 5. The winding unit 25 in the motor body 21 in this example has the same structure as in the first example, and will not be described in detail. In the third example, the winding portions L5, L6, and L7 have coil components 51, 61, and 71 that serve as the primary coils 531, 631, and 731 in the transformers 53, 63, and 73 for the respective phases. More specifically, the transformer 53 includes the coil component 51 serving as the primary coil 531 for the U phase. The transformer 63 includes the coil component 61 serving as the primary coil 631 for the V phase. The transformer 73 includes the coil component 71 serving as the primary coil 731 for the W phase. Thus, in the third example, the transformers 53, 63, and 73 for the respective phases include the secondary coils 532, 632, and 732 wound around the stator core, with the main coils in the winding unit that serve as the primary coils also being wound around the stator core. The secondary coil 532 in the transformer 53, the secondary coil 632 in the transformer 63 for the V phase, and the secondary coil 732 in the transformer 73 for the W phase are connected to the supply unit 215. The secondary coils 532, 632, and 732 are also connected to the signal exchanger 216.

In the third example as well, the transformers for the respective phases basically have the same ratio of turns, but may have different ratios of turns. In the example of FIG. 5, the structure includes transformers for all the three phases, and each transformer has the secondary coil connected to the supply unit 215 and to the signal exchanger 216. In some embodiments, the structure may include one or more transformers for one or two of the three phases, and the transformer(s) may have the secondary coil connected to the supply unit 215 and to the signal exchanger 216. In another embodiment, the structure may include transformers for all the three phases, and one or more of the transformers may have the secondary coil connected to the supply unit 215 with the remaining transformer(s) having the secondary coil connected to the signal exchanger 216. In this case, the transformer(s) connected to the supply unit 215 to supply power to the encoder 22 may have a ratio of turns selected as appropriate. The transformer(s) connected to the signal exchanger 216 to transmit or receive the predetermined signal to or from the encoder 22 may have a ratio of turns selected as appropriate.

The winding unit 25 and the transformers 53, 63, and 73 with the above structure allow the extractor 214 to extract, as the driving power for the encoder 22, a part of the power supplied to the motor 2 through the power line 11. This structure can constantly and stably supply power to the encoder 22 while the motor 2 is being driven. The structure also eliminates cabling for the encoder 22, greatly reducing the work and the cost for cabling. In the third example, the secondary coils in the transformers are wound around the stator core, and thus allow the stator 213 to have a smaller coil end.

The transformers 53, 63, and 73 shown in FIGS. 3 to 5 are two-winding ransformers, but may be replaced with autotransformers in modifications. For the transformers shown in FIG. 5 being autotransformers, for example, each of the transformers 53, 63, and 73 includes a primary coil being the winding unit 25 in the motor 2 and a secondary coil being a portion of the winding unit 25. In other words, the winding unit 25 includes portions that serve as both the primary coils and the secondary coils.

Figure 6:
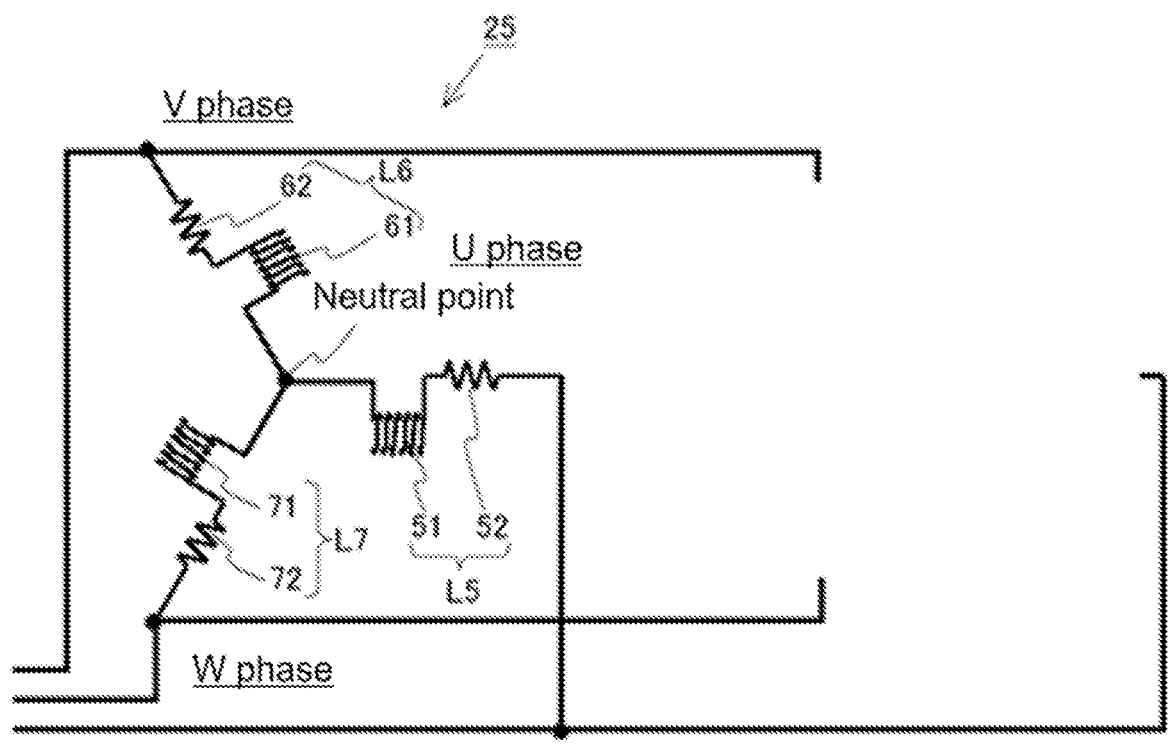
FIG. 6 is a fourth schematic diagram of a winding unit in the motor and transformers located in the winding unit.

A modification of the example of FIG. 4 will now be described with reference to FIG. 6. In the example of FIG. 4, the transformers 53, 63, and 73 are respectively located in parallel to the winding portions L5, L6, and L7 for the three phases, as described above. In another example, power may be extracted from between the winding portions L5, L6, and L7 for the respective phases, and the extracted power may be transmitted to a rectifier, a smoothing circuit, and a step-up or step-down circuit including a DC-DC converter. In this example, the extractor 214 extracts power directly from the winding unit 25, rather than extracting power from the winding unit 25 using transformers. This structure is also within the scope of the present invention.

Figure 7:
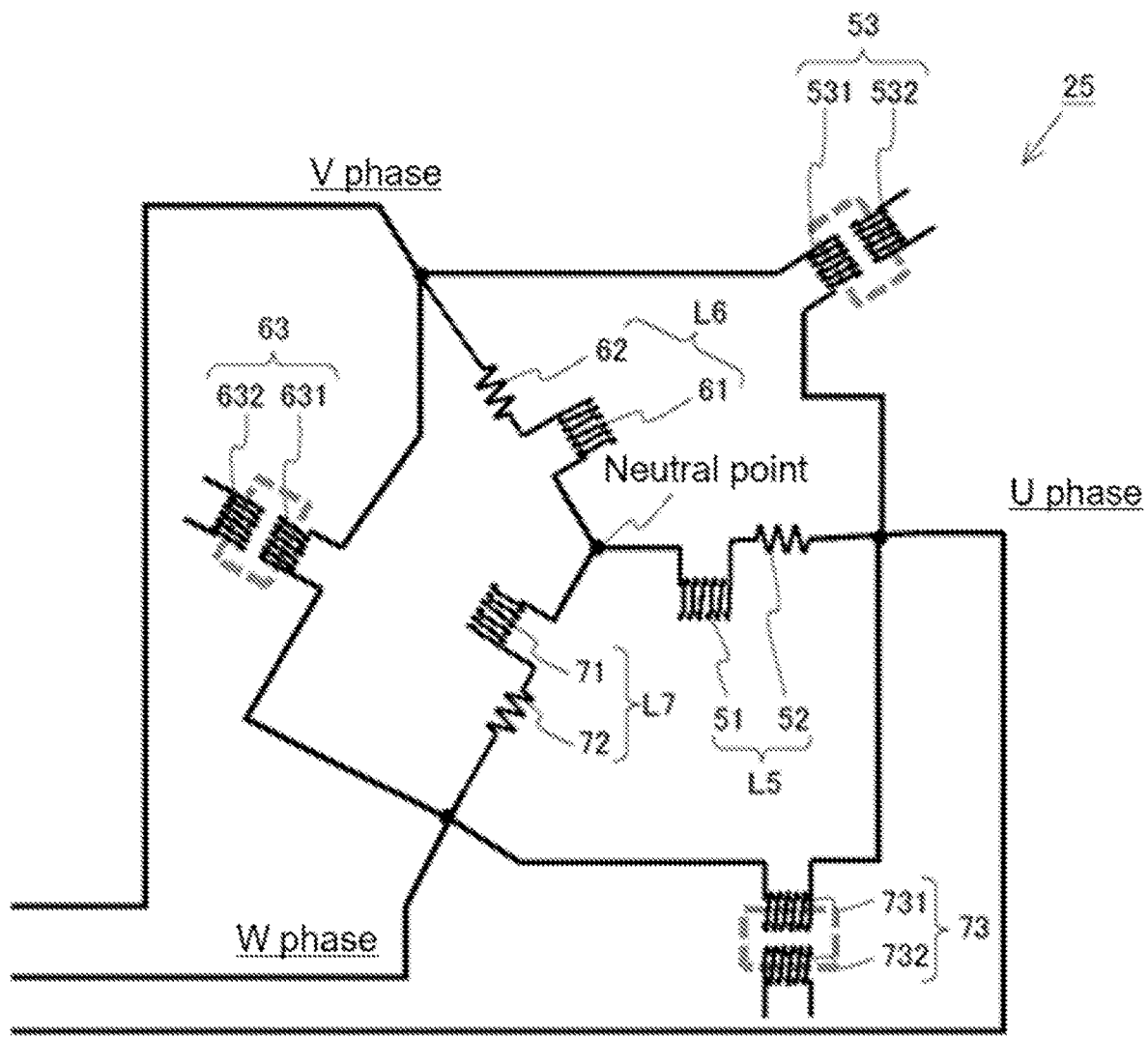
FIG. 7 is a fifth schematic diagram of a winding unit in the motor and transformers located in the winding unit.

A fourth example will now be described with reference to FIG. 7. The winding unit 25 in the motor body 21 in this example has the same structure as in the first example, and will not be described in detail. In the fourth example, the primary coil 531 in the transformer 53 is connected between the U phase and the V phase in parallel to the winding portions L5 and L6 for the U and V phases. The primary coil 631 in the transformer 63 is connected between the V phase and the W phase in parallel to the winding portions L6 and L7 for the V and W phases. The primary coil 731 in the transformer 73 is connected between the W phase and the U phase in parallel to the winding portions L7 and L5 for the W and U phases. The secondary coil 532 in the transformer 53, the secondary coil 632 in the transformer 63, and the secondary coil 732 in the transformer 73 are connected to the supply unit 215. The secondary coils 532, 632, and 732 are also connected to the signal exchanger 216.

In the fourth example as well, the transformers for the respective phases basically have the same ratio of turns, but may have different ratios of turns. In the example of FIG. 7, the structure includes a transformer between every pair of phases of the three phases, and each transformer has the secondary coil connected to the supply unit 215 and to the signal exchanger 216. In some embodiments, the structure may include one or more transformers between two or more of the three phases, and the transformer(s) may have the secondary coil connected to the supply unit 215 and to the signal exchanger 216. In another embodiment, the structure may include a transformer between every pair of phases of the three phases, and one or more of the transformers may have the secondary coil connected to the supply unit 215 with the remaining transformer(s) having the secondary coil connected to the signal exchanger 216. In this case, the transformer(s) connected to the supply unit 215 to supply power to the encoder 22 may have a ratio of turns selected as appropriate. The transformer(s) connected to the signal exchanger 216 to transmit or receive the predetermined signal to or from the encoder 22 may have a ratio of turns selected as appropriate.

The winding unit 25 and the transformers 53, 63, and 73 with the above structure allow the extractor 214 to extract, as the driving power for the encoder 22, a part of the power supplied to the motor 2 through the power line 11. This structure can constantly and stably supply power to the encoder 22 while the motor 2 is being driven. The structure also eliminates cabling for the encoder 22, greatly reducing the work and the cost for cabling. In the fourth example as well, the transformer for each phase may be located at the coil end in the stator 213, similarly to the first example.

Power Supply Control

The motor 2 including the winding unit 25 and the transformers in the first to third examples above can extract power for the encoder 22 from the driving power supplied to the motor 2. However, when the motor 2 receives low driving power, such as when the motor 2 operates at low speed and light load, the motor 2 cannot supply sufficient power with the supply unit 215 to drive the encoder 22, possibly affecting the operation of the encoder 22. To avoid such unstable power supply to the encoder 22, power supply control shown in FIG. 8 is performed.

Figure 8:
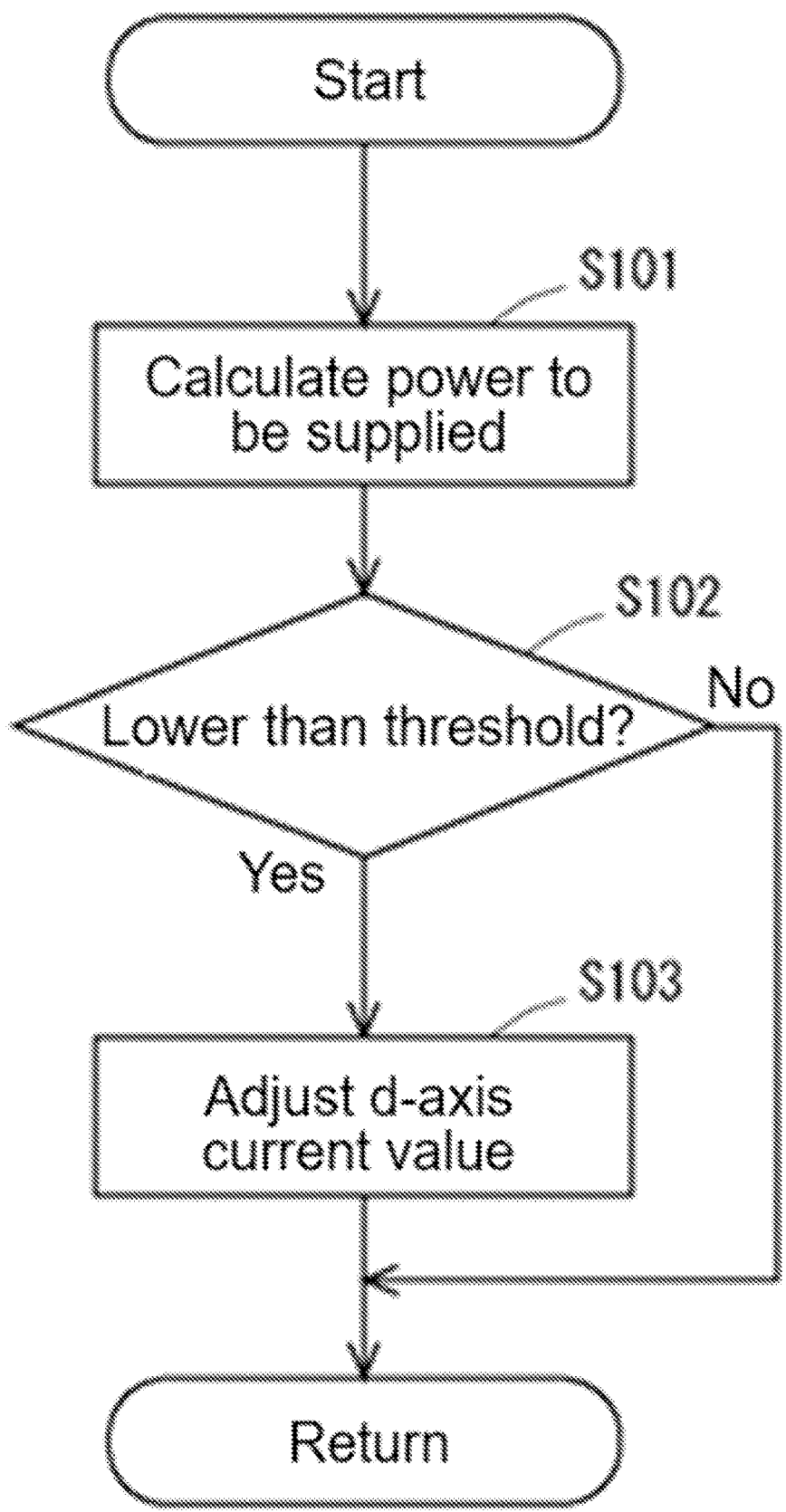
FIG. 8 is a flowchart of power supply control for the motor performed by a driver.

The power supply control shown in FIG. 8 is repeatedly performed by the control unit 41 in the servo driver 4 for supplying power to the motor 2. Power is supplied to the motor 2 using known vector control, which is not described in detail herein. First, in S101, the power to be supplied to the encoder 22 by the supply unit 215 is calculated. The power to be supplied results from extracting a part of power actually supplied to the motor 2 through the power line 11, and can thus be calculated by reflecting, for example, the voltage applied for each phase, the induced voltage and the impedance of the motor body 21, and the impedances of the transformers.

In S102, the determination is performed as to whether the power to be supplied that is calculated in S101 is lower than a threshold associated with the driving power for the encoder 22. The threshold may be the maximum value of the driving power in the range of variation occurring during the operation of the encoder 22, or may be any other value (e.g., the minimum value or the middle value in the range of variation). In response to an affirmative determination result in S102, the processing advances to S103. In S103, the d-axis current value is increased in the vector control for supplying power to the motor 2. The drive of the motor 2 is less susceptible to the increase in the d-axis current value in S103, with the d-axis current value indicating a current that does not contribute to the torque of the motor 2. When the current to the motor 2 is lowered, the current can also be increased through current control performed by the control unit 41. The degree of increase in the d-axis current value may be adjusted to be greater for a greater difference between the power to be supplied that is calculated in S101 and the above threshold. In response to a negative determination result in S102, the control process is complete.

The power supply control shown in FIG. 8 allows appropriate power supply to the encoder 22 independently of the operating state of the motor 2.

First Modification of Power Supply Control

Figure 10A:
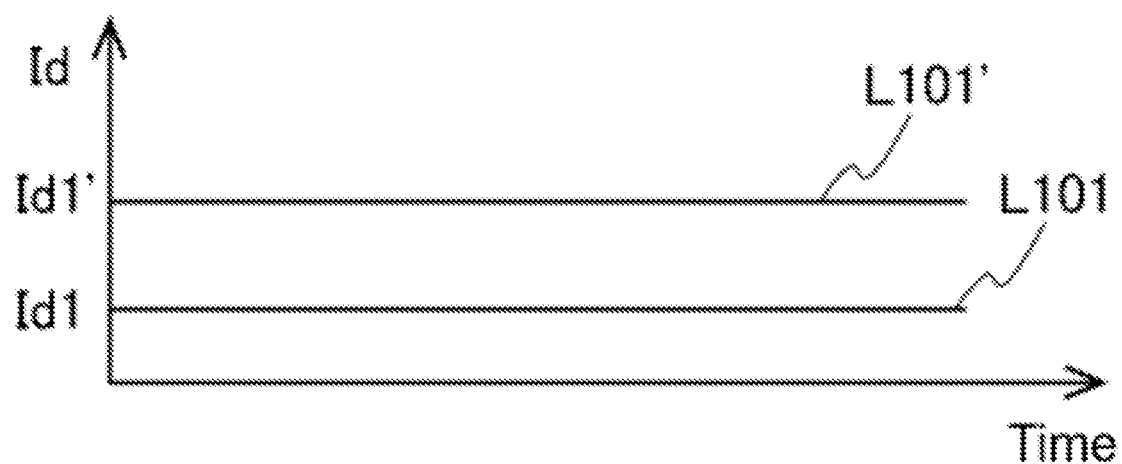
FIGS. 10A and 10B are each a first diagram describing the manner of increasing the d-axis current value for power supply.
Figure 10A:
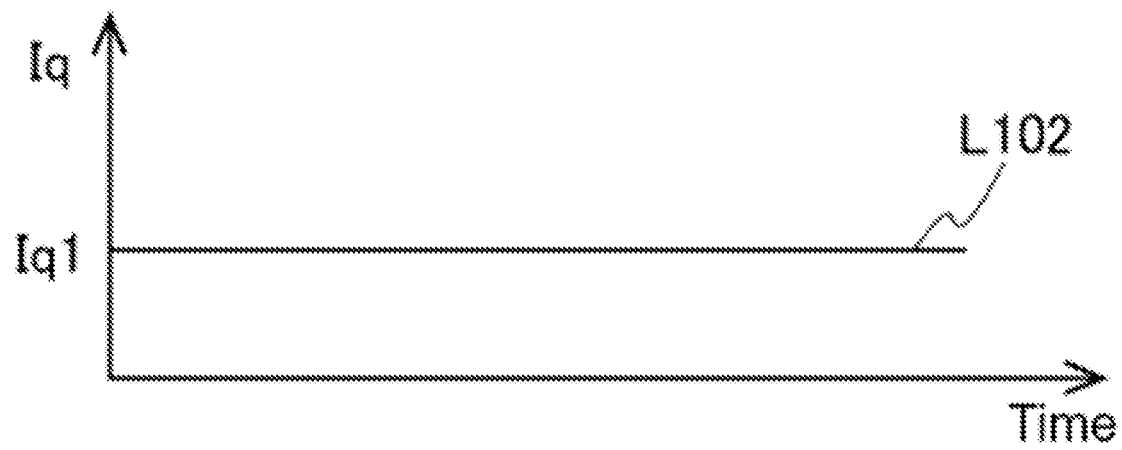
Figure 10B:
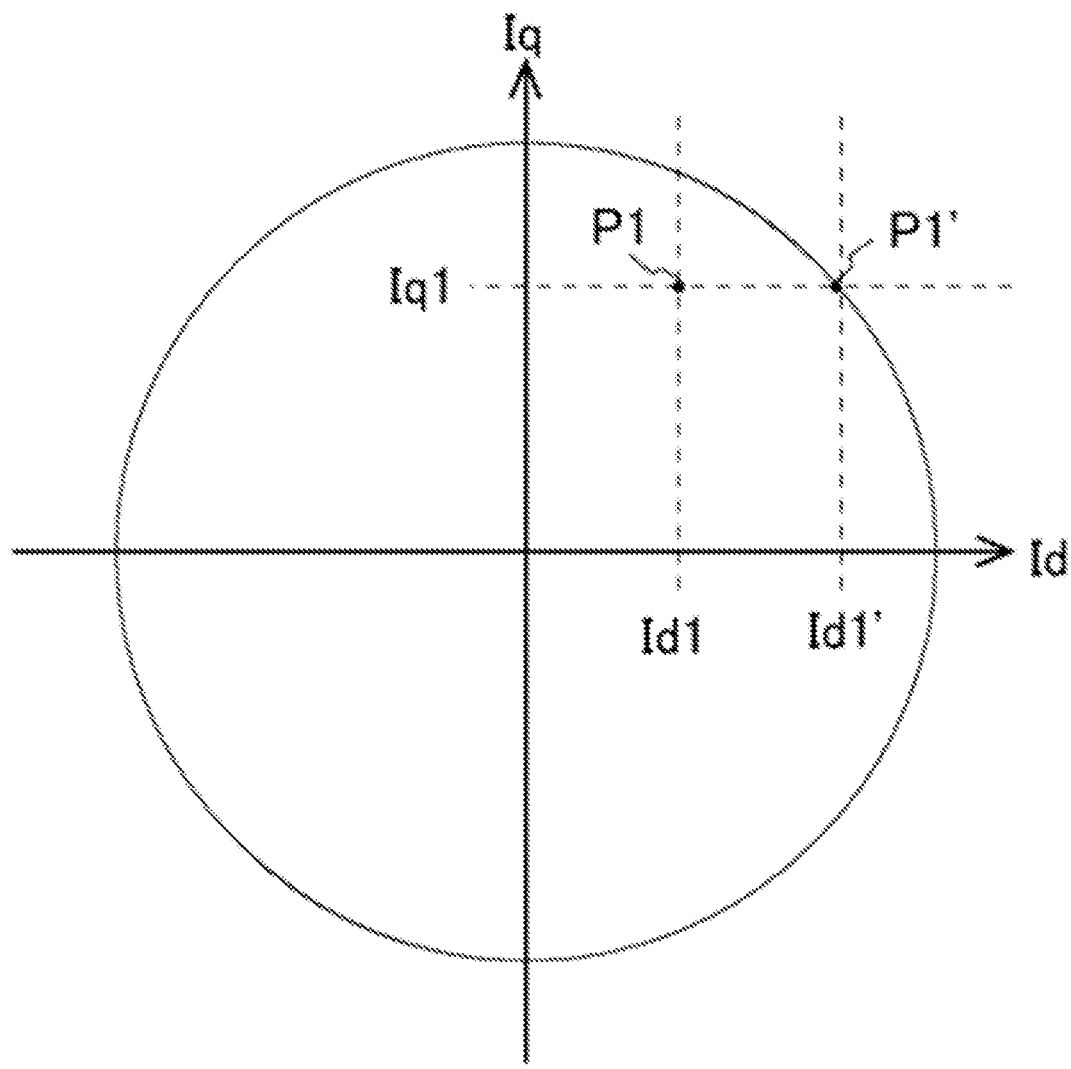
Figure 11A:
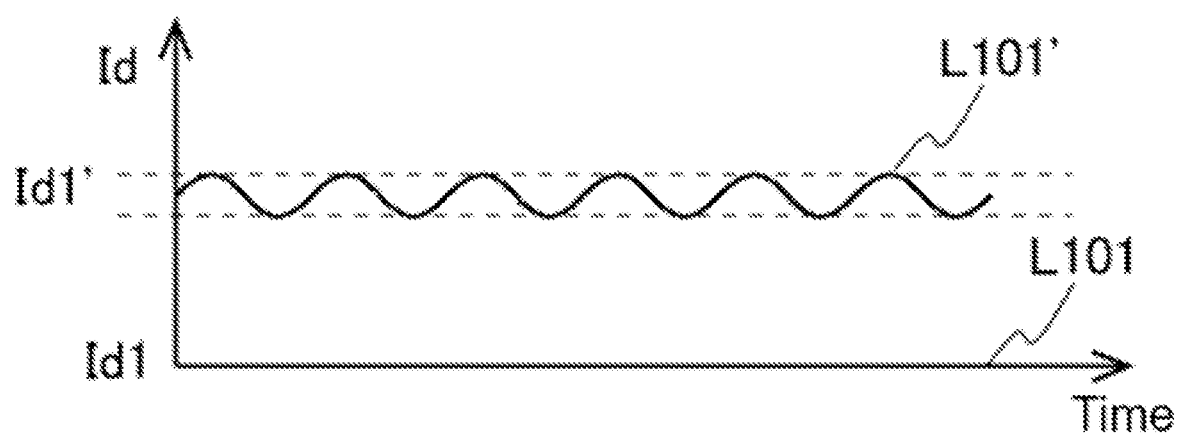
FIGS. 11A and 11B are each a second diagram describing the manner of increasing the d-axis current value for power supply.
Figure 11A:
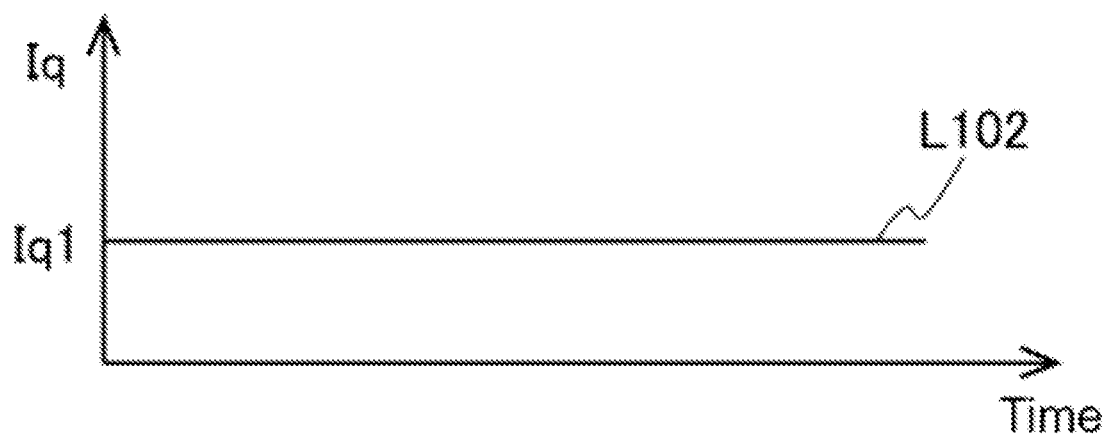

Power supply control using the d-axis current value will now be described in detail with reference to FIGS. 9 to 11. In the present modification, the servo driver 4 includes an output unit that outputs, to the motor 2, driving power for the motor 2 on which first power for driving the encoder 22 is superimposed. The output unit corresponds to the power converter 43 shown in FIG. 1, or is a functional unit incorporated in the power converter 43. The output unit controls the d-axis current value in the driving current for the motor 2 to adjust the first power to be superimposed on the driving power for the motor 2. The superimposition of the first power will be mainly described below.

Figure 9:
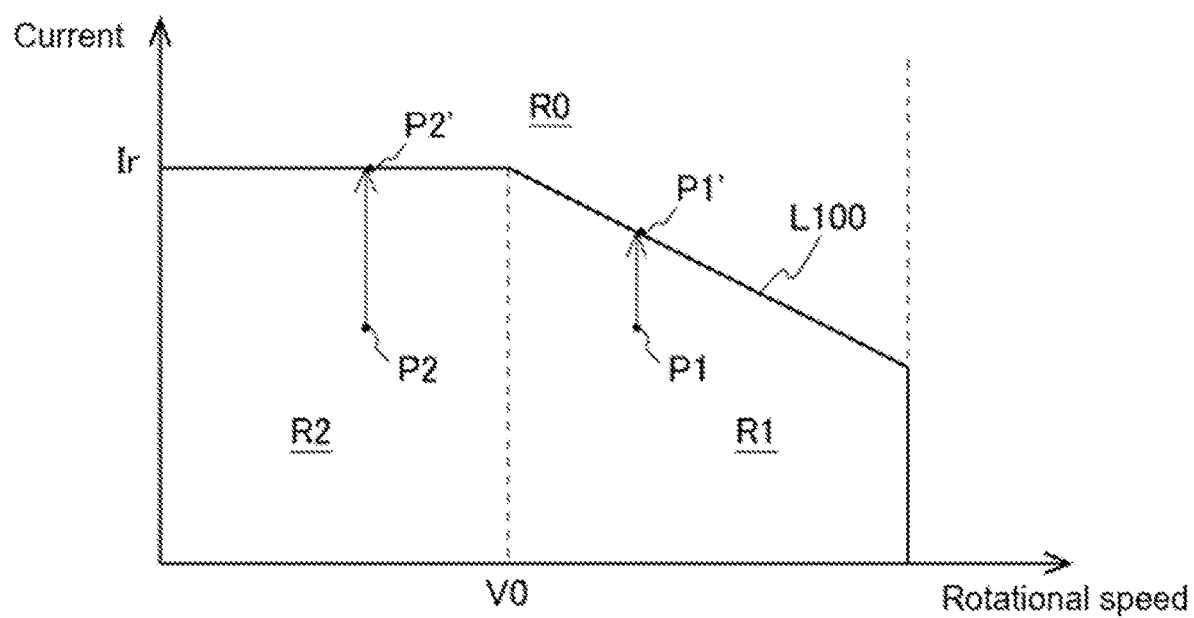
FIG. 9 is a graph of the correlation between the rotational speed of the motor and the current applied by the driver.

FIG. 9 is a graph of the correlation between the rotational speed of the motor 2 and the current applied by the servo driver 4. In a lower-speed area of the motor 2 (e.g., the area with the rotational speed being less than or equal to V0), the motor 2 is driven and controlled with a driving current including substantially a q-axis current alone without a d-axis current. In a higher-speed area of the motor 2 (e.g., the area with the rotational speed being greater than V0), the motor 2 receives a driving current having a higher d-axis current value at a higher rotational speed. The maximum current that substantially contributes to the torque of the motor 2 is indicated by a line L100. The area inside the line L100 (the area including the origin) includes a lower-speed area R2 in which the upper limit of the current is substantially constant, or specifically at a rated current Ir, and a higher-speed area R1 in which the upper limit of the current decreases as the rotational speed increases. The area outside the line L100 is an area R0 in which the driving current is not allowed to or cannot be applied to the motor 2 by the servo driver 4. The above power supply control using the d-axis current value is thus performed within the area R1 and the area R2.

The power supply control for the motor 2 in the state indicated by a point P1 in the area R1 will now be described with reference to FIGS. 10A and 10B. In the state indicated by the point P1, as shown in FIG. 10A, the driving current output to the motor 2 from the servo driver 4 has the q-axis current value being Iq1 (a line L102) and the d-axis current value being Id1 (a line L101). For the motor 2 being in an unchanged drive state, the q-axis current value and the d-axis current value are unchanged over time. When the driving power for the motor 2 on which the driving power (first power) for the encoder 22 is superimposed is output to the motor 2, the d-axis current value is increased from Id1 up to Id1' (a line L101') while the q-axis current value is maintained at Iq1. As shown in FIG. 10B, the d-axis current value can be increased up to Id1' at which the current output to the motor 2 reaches a point P1' on the line L100 in FIG. 9 when the q-axis current value is Iq1. The circle in FIG. 10B has the radius indicating the rated current Ir.

In the motor 2 having a relatively high rotational speed greater than V0, the above extractor 214 extracts power with the transformers at higher efficiency, with a higher electrical angular frequency of the current flowing through the windings in the motor 2. In this case, as shown in FIG. 10A, the d-axis current value is increased from Id1 up to Id1' and not to vary over time. The driving power (first power) for the encoder 22 is thus superimposed on the driving power for the motor 2 and output from the servo driver 4 to the motor 2. A part of the output power, or specifically, the power corresponding to the increase in the d-axis current value, is extracted by the extractor 214 and supplied to the encoder 22.

Figure 11B:
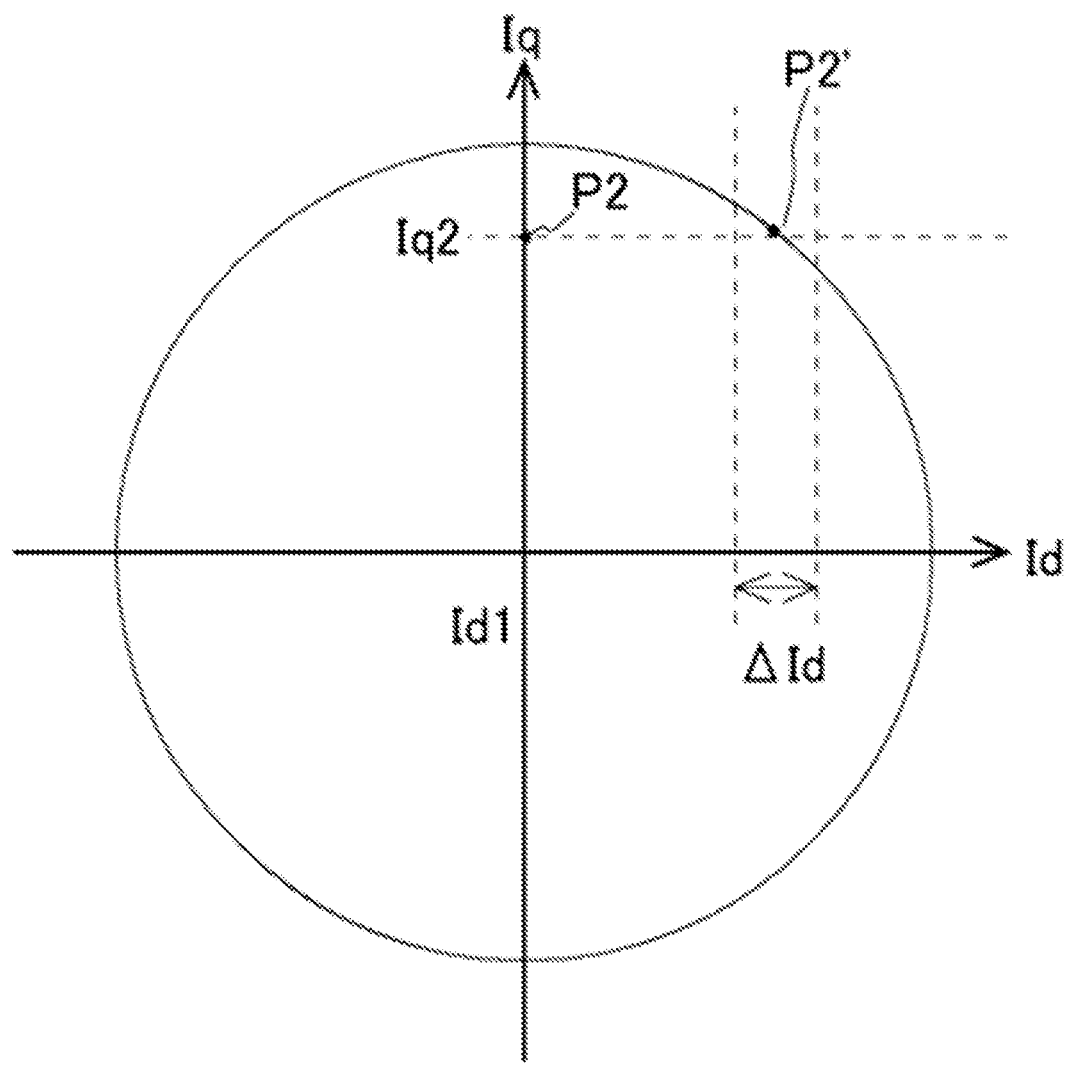

The power supply control for the motor 2 in the state indicated by a point P2 in the area R2 will now be described with reference to FIGS. 11A and 11B. In the state indicated by the point P2, as shown in FIG. 11A, the driving current output to the motor 2 from the servo driver 4 has the q-axis current value being Iq1 (the line L102) and the d-axis current value being Id1 (the line L101, Id1=0). For the motor 2 being in an unchanged drive state, the q-axis current value and the d-axis current value are unchanged over time.

In the motor 2 having a relatively low rotational speed less than or equal to V0, the above power extraction with the transformers is performed at lower efficiency, with a lower electrical angular frequency of the driving current flowing through the windings in the motor 2. When the driving power for the motor 2 on which the driving power (first power) for the encoder 22 is superimposed is output to the motor 2, the d-axis current value is increased from Id1 to Id1' while the q-axis current value is maintained at Iq1. In this case, as shown in FIG. 11A, the d-axis current value is increased to Id1' to vary over time with a predetermined offset of a DC component, unlike the example of FIG. 10A. In other words, the increased d-axis current value is not constant but varies over time at a predetermined amplitude and at a predetermined frequency. When the increased d-axis current value is expressed as an effective value as shown in FIG. 11B, the current output to the motor 2 reaches a point P2' on the line L100 in FIG. 9. In FIG. 11B, the d-axis current Id1' varies over time by an amount ΔId.

The increased d-axis current value may vary as a sine wave oscillating at a predetermined frequency. The predetermined frequency is, for example, higher than the electrical angular frequency of the driving current associated with the rotational speed of the motor 2. The increased d-axis current value may vary as a square wave or a triangular wave. The offset of the DC component above can be adjusted as appropriate based on the power to be supplied to the encoder 22.

Thus, for the motor 2 being in the drive state within the area R2, the d-axis current value is increased from Id1 up to Id1' and to vary over time. The driving power (first power) for the encoder 22 is thus superimposed on the driving power for the motor 2 and output from the servo driver 4 to the motor 2. When the driving current through the motor 2 has a low electrical angular frequency, the extractor 214 can thus appropriately extract a part of the output power, or specifically, the power corresponding to the increase in the d-axis current value, and supply the extracted power to the encoder 22.

To control the d-axis current value as described above, feedback control may be performed based on the power actually extracted by the extractor 214 in the motor 2 and on the power to be supplied to the encoder 22. In the feedback control, information about the power actually extracted by the extractor 214 and about the power to be supplied to the encoder 22 is transmitted wirelessly from the motor 2 to the servo driver 4. In another embodiment, predetermined information about the power to be supplied to the encoder 22 may be stored in the servo driver 4.

As described above, in the present modification, the d-axis current is controlled to superimpose the driving power (first power) for the encoder 22 based on the rotational speed of the motor 2 to allow efficient power extraction by the extractor 214 with the transformers. In the present modification, the rotational speed V0 is at the boundary between the higher-speed area and the lower-speed area. However, the rotational speed V0 may be set as appropriate to allow efficient power extraction with the transformers, rather than matching the changing point of the boundary value of the current indicated by the line L100 (the point at which the current starts to decrease as the rotational speed increases).

In the control of the d-axis current value described above, the first power to be generated and superimposed is increased by increasing the d-axis current. However, the first power to be superimposed may be adjusted by combining an increase and a decrease of the d-axis current value and the q-axis current value as appropriate for the type of the motor (e.g., an SPM or an IPM). Thus, the first power to be generated may be adjusted by controlling the d-axis current value and the q-axis current value to increase or decrease these current values as appropriate.

Second Modification of Power Supply Control

When the motor 2 (or specifically the rotor 212 in the motor 2) is stopped or is to be stopped, no power is typically supplied to the motor 2. This can cause insufficient power supply to the encoder 22. In the present modification, when the motor 2 is stopped, power supply to the motor 2 is performed by controlling the q-axis current value at a constant value that causes the motor 2 to stop and by controlling the d-axis current value to vary over time (e.g., to vary as a sine wave). With such power supplied, the motor 2 is stopped without rotating, with the q-axis current value being a constant value that causes the motor 2 to stop. When the motor 2 is stopped, the q-axis current value may typically be set to zero under a substantially zero external force applied to the motor 2. Under any external force such as an unbalanced load, the q-axis current value may be set to a value that generates torque to resist the external force.

In this state, the d-axis current varying over time is applied to the motor 2. Thus, the motor 2 being stopped can supply a part of the received power to the encoder 22 using the transformers. The value of the d-axis current to be applied may vary as a sine wave, or as any other wave such as a square wave or a triangular wave.

For the motor 2 in the example of FIG. 3 with single-phase transformers, the circuit equations will now be described. The transformers for the respective phases have the same characteristics. In the formulas below, Vu, Vv, and Vw are the output voltages of the driver 4 for the respective phases, and Iu, Iv, and Iw are the currents of the driver 4 for the respective phases. Lu, Lv, and Lw are the self-inductances of the motor 2 for the respective phases, and Muv, Mvw, and Mwu are the mutual inductances between the phases of the motor 2. In the formulas below, we is the electrical angular frequency, φuvw is the maximum number of flux linkages of the mature windings, R is the winding resistance, Ke is the induced voltage constant, and s is the differential operator. Vux2, Vvx2, and Vwx2 are the output voltages of the secondary portions of the transformers, and Iux2, Ivx2, and Iwx2 are the currents of the secondary portions of the transformers. Lx1, Lx2, and Mx are respectively the primary inductance, the secondary inductance, and the mutual inductance of the transformers. Rx1 and Rx2 are respectively the primary winding resistance and the secondary winding resistance of the transformers. In the formulas below, θe is the electrical angle.

The circuit equations for the motor 2 are expressed as Formulas 1 and 2 below.

[Math 1]

$$\begin{bmatrix} V_u \\ V_v \\ V_w \\ V_{ux2} \\ V_{vx2} \\ V_{wx2} \end{bmatrix} = Z_{uvw1} \begin{bmatrix} I_u \\ I_v \\ I_w \\ I_{ux2} \\ I_{vx2} \\ I_{wx2} \end{bmatrix} + \begin{bmatrix} -\omega_e \phi_{uvw} \sin(\theta_e) \\ -\omega_e \phi_{uvw} \sin\left(\theta_e - \frac{2}{3}\pi\right) \\ -\omega_e \phi_{uvw} \sin\left(\theta_e + \frac{2}{3}\pi\right) \\ 0 \\ 0 \\ 0 \end{bmatrix} \quad (1)$$

[Math 2]

$$Z_{uvw1} = \begin{bmatrix} R_{x1} + R + s(L_{x1} + L_u) & sM_{uv} & sM_{wu} & sM_x & 0 & 0 \\ sM_{uv} & R_{x1} + R + s(L_{x1} + L_v) & sM_{vw} & 0 & sM_x & 0 \\ sM_{wu} & sM_{vw} & R_{x2} + R + s(L_{x1} + L_w) & 0 & 0 & sM_x \\ sM_x & 0 & 0 & R_{x2} + sL_{x2} & 0 & 0 \\ 0 & sM_x & 0 & 0 & R_{x2} + sL_{x2} & 0 \\ 0 & 0 & sM_x & 0 & 0 & R_{x2} + sL_{x2} \end{bmatrix} \quad (2)$$

The above formulas are further transformed to the circuit equations expressed as Formulas 3 and 4 below through the transformation from the three phases U, V, and W to the two phases d and q and the transformation from a fixed coordinate system to a rotating coordinate system.

[Math 3]

$$\begin{bmatrix} V_d \\ V_q \\ V_{dx2} \\ V_{qx2} \end{bmatrix} = Z_{dq1} \begin{bmatrix} I_d \\ I_q \\ I_{dx2} \\ I_{qx2} \end{bmatrix} + \begin{bmatrix} 0 \\ \omega_e K_e \\ 0 \\ 0 \end{bmatrix} \quad (3)$$

[Math 4]

$$Z_{dq1} = \begin{bmatrix} R_{x1} + R + s(L_{x1} + L_d) & -\omega_e(L_{x1} + L_q) & sM_x & -\omega_e M_x \\ \omega_e(L_{x1} + L_d) & R_{x1} + R + s(L_{x1} + L_q) & \omega_e M_x & sM_x \\ sM_x & -\omega_e M_x & R_{x2} + sL_{x2} & -\omega_e L_{x2} \\ \omega_e M_x & sM_x & \omega_e L_{x2} & R_{x2} + sL_{x2} \end{bmatrix} \quad (4)$$

Figure 13A:
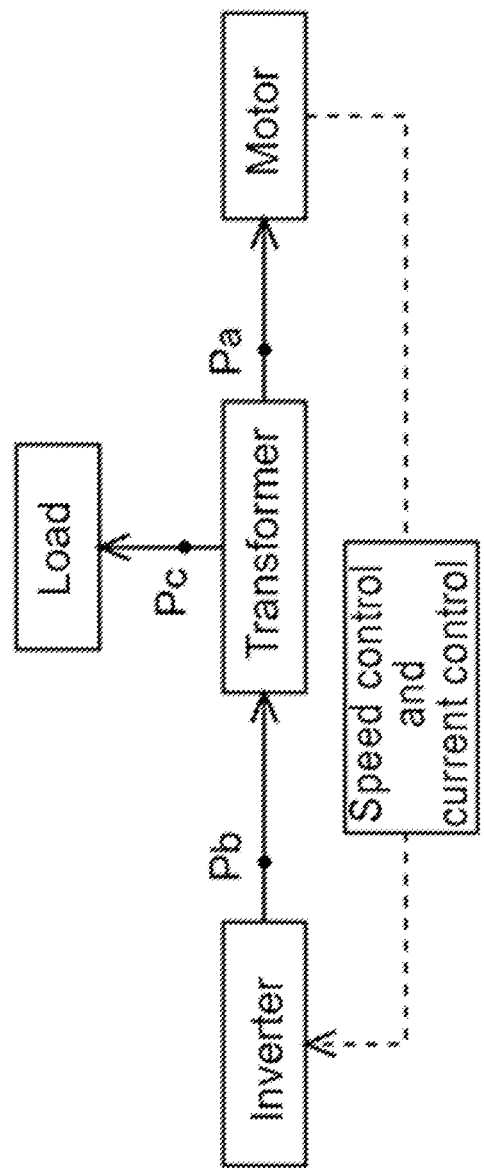
FIGS. 13A and 13B are each a schematic diagram of a circuit model for verifying circuit equations for the motor.
Figure 13B:
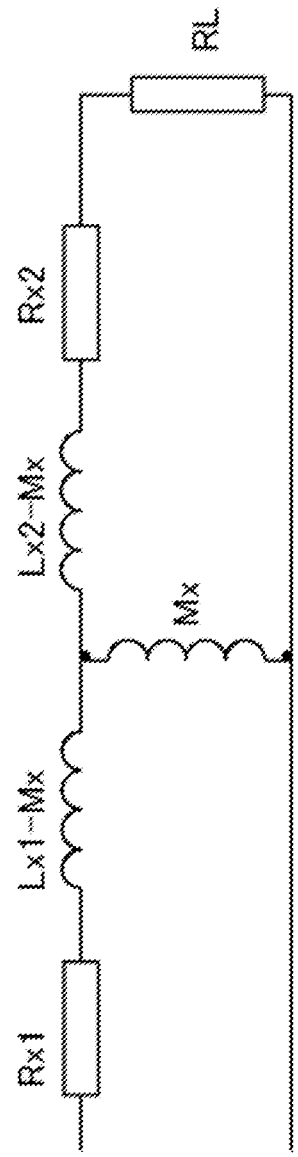

Formulas 3 and 4 will now be verified. FIG. 13A (upper figure) is a schematic diagram of a circuit model for verifying the formulas. An inverter (corresponding to the driver 4) receives power from a DC power supply and supplies a driving current to the motor 2 through a power line to drive the motor 2. The model shown in FIG. 13A includes a transformer between the power line and the motor body, and a load RL (e.g., a sensor) connected to the secondary portion of the transformer. The inverter has the outputs for the three phases each connected to a single-phase transformer, to which the motor is connected in the subsequent stage. The inverter supplies the driving current to drive the motor with current control and speed control. In the current control, for example, parameters associated with the motor characteristics are fed back as appropriate to the inverter, which then uses the parameters to generate the driving current. FIG. 13B (lower figure) is a diagram of the single-phase transformer and the load. The parameters for the motor and the transformer in the circuit model are shown in Tables 1 and 2 below.

Parameters for Motor

TABLE 1

|  | Symbol | Value | Unit |
|---|---|---|---|
| Winding resistance | R | 2.5 | Ω |
| d-axis inductance | Ld | $2.1 \times 10^{-3}$ | H |
| q-axis inductance | Lq | $2.1 \times 10^{-3}$ | H |
| Induced voltage constant | Ke | 0.1386 | V/(rad/s) |
| Torque constant | Kt | 0.1386 | Nm/A |
| Electrical angular frequency | ωe | 523.60 | rad/s |
| Mechanical angular frequency | ωm | 104.72 | rad/s |
| Number of pole pairs | P | 5 | Pole |
| Inertia | J | $0.16 \times 10^{-3}$ | kg·m² |
| Viscosity | D | $1.3 \times 10^{-3}$ | Nm/(rad/s) |

Parameters for Transformer

TABLE 2

|  | Symbol | Value | Unit |
|---|---|---|---|
| Primary self-inductance | Lx1 | $960 \times 10^{-6}$ | H |
| Secondary self-inductance | Lx2 | $960 \times 10^{-6}$ | H |
| Primary winding resistance | Rx1 | 1.14 | Ω |
| Secondary winding resistance | Rx2 | 1.14 | Ω |
| Mutual inductance | Mx | $950 \times 10^{-6}$ | H |
| Ratio of turns | N | 1 | — |
| Coupling coefficient | k | 0.99 | — |
| Load resistance | RL | 1 | Ω |

FIG. 13A shows three measurement points Pa, Pb, and Pc at which voltages and currents are measured for the three phases. In the simulation using the circuit model, voltages and currents are measured at the measurement points Pa, Pb, and Pc for the three phases. The measured values are used to calculate voltages and currents for the d-axis and the q-axis. At the measurement point Pa, the voltage and the current of a terminal in the motor are calculated. At the measurement point Pb, the voltage and the current output from the inverter are calculated. At the measurement point Pc, the voltage and the current output from the transformer are calculated. At each measurement point, these calculated values are compared with the values calculated using the above circuit equations for each of the d-axis voltage and the q-axis voltage. The calculation and the comparison are performed with the motor having a fixed rotational speed.

Tables 3 to 5 below show the comparison results.

Comparison Results at Measurement Point Pa

TABLE 3

| Speed (rpm) | d-axis voltage (V) | | q-axis voltage (V) | |
|---|---|---|---|---|
|  | Circuit equation | Circuit model | Circuit equation | Circuit model |
| 1000 | 1.4215 | 1.4207 | 18.6200 | 18.0668 |
| 2000 | −1.8139 | −1.8193 | 36.1241 | 36.1343 |

TABLE 3-continued

| Speed (rpm) | d-axis voltage (V) | | q-axis voltage (V) | |
|---|---|---|---|---|
|  | Circuit equation | Circuit model | Circuit equation | Circuit model |
| 3000 | −7.2063 | −7.2190 | 54.1861 | 54.2036 |
| 4000 | −14.7557 | −14.7811 | 72.2481 | 72.2710 |
| 5000 | −24.4621 | −24.5006 | 90.3102 | 90.3233 |

Comparison Results at Measurement Point Pb

TABLE 4

| Speed (rpm) | d-axis voltage (V) | | q-axis voltage (V) | |
|---|---|---|---|---|
|  | Circuit equation | Circuit model | Circuit equation | Circuit model |
| 1000 | 2.2035 | 2.2050 | 19.7736 | 19.7743 |
| 2000 | −1.9256 | −1.9222 | 39.9500 | 39.9526 |
| 3000 | −8.3860 | −8.3800 | 60.6357 | 60.6422 |
| 4000 | −16.9342 | −16.9278 | 81.7083 | 81.7161 |
| 5000 | −27.4877 | −27.4743 | 103.0061 | 103.0240 |

Comparison Results at Measurement Point Pc

TABLE 5

| Speed (rpm) | d-axis voltage (V) | | q-axis voltage (V) | |
|---|---|---|---|---|
|  | Circuit equation | Circuit model | Circuit equation | Circuit model |
| 1000 | −0.1646 | −0.1647 | 0.2708 | 0.2706 |
| 2000 | −0.5694 | −0.5693 | 0.7316 | 0.7316 |
| 3000 | −1.0454 | −1.0451 | 1.4324 | 1.4378 |
| 4000 | −1.4779 | −1.4781 | 2.3156 | 2.3164 |
| 5000 | −1.8277 | −1.8261 | 3.3048 | 3.3061 |

The above comparison results reveal that the values calculated using the circuit equations are within an error of 1% as compared with the values calculated using the circuit model. The above circuit equations, or Formulas 3 and 4, are thus verified. The above results also reveal that the current control and the speed control are unlikely to be affected by the transformer for power extraction incorporated in the motor. Thus, the above circuit equations can be used to design the motor incorporating the transformer.

For the motor 2 in the example of FIG. 3 with three-phase transformers, the circuit equations are expressed as Formulas 5 and 6 below. These formulas may also be used to design the motor.

[Math 5]

$$\begin{bmatrix} V_d \\ V_q \\ V_{dx2} \\ V_{qx2} \end{bmatrix} = Z_{dq1} \begin{bmatrix} I_d \\ I_q \\ I_{dx2} \\ I_{qx2} \end{bmatrix} + \begin{bmatrix} 0 \\ \omega_e K_e \\ 0 \\ 0 \end{bmatrix} \quad (5)$$

-continued

[Math 6]

$$Z_{dq2} = \begin{bmatrix} R_{x1}+R+ s\left(L_{x1}+\frac{1}{2}M_{xp1}+L_d\right) & -\omega_e\left(L_{x1}+\frac{1}{2}M_{xp1}+L_q\right) & \frac{3}{2}sM_x & -\omega_e\frac{3}{2}M_x \\ \omega_e\left(L_{x1}+\frac{1}{2}M_{xp1}+L_d\right) & R_{x1}+R+ s\left(L_{x1}+\frac{1}{2}M_{xp1}+L_q\right) & \omega_e\frac{3}{2}M_x & \frac{3}{2}sM_x \\ \frac{3}{2}sM_x & -\omega_e\frac{3}{2}M_x & R_{x2}+ s\left(L_{x2}+\frac{1}{2}M_{xp2}\right) & -\omega_e\left(L_{x2}+\frac{3}{2}M_{xp2}\right) \\ \omega_e\frac{3}{2}M_x & \frac{3}{2}sM_x & \omega_e\left(L_{x2}+\frac{1}{2}M_{xp2}\right) & R_{x2}+ s\left(L_{x2}+\frac{1}{2}M_{xp2}\right) \end{bmatrix} \quad (6)$$

For the motor 2 in the example of FIG. 5 with transformers, the circuit equations are expressed as Formulas 7 and 8 below. These formulas may also be used to design the motor.

[Math 7]

$$\begin{bmatrix} V_d \\ V_q \\ V_{dx2} \\ V_{qx2} \end{bmatrix} = Z_{dq1}\begin{bmatrix} I_d \\ I_q \\ I_{dx2} \\ I_{qx2} \end{bmatrix} + \begin{bmatrix} 0 \\ \omega_e K_e \\ 0 \\ \omega_e K_{ex} \end{bmatrix} \quad (7)$$

[Math 8]

$$\begin{bmatrix} R+sL_d & -\omega_e L_q & \frac{3}{2}sM_x & -\omega_e\frac{3}{2}M_x \\ \omega_e L_d & R+sL_q & \omega_e\frac{3}{2}M_x & \frac{3}{2}sM_x \\ \frac{3}{2}sM_x & -\omega_e\frac{3}{2}M_x & R_{x2}+ s\left(L_{x2}+\frac{1}{2}M_{xp2}\right) & -\omega_e\left(L_{x2}+\frac{1}{2}M_{xp2}\right) \\ \omega_e\frac{3}{2}M_x & \frac{3}{2}sM_x & \omega_e\left(L_{x2}+\frac{1}{2}M_{xp2}\right) & R_{x2}+ s\left(L_{x2}+\frac{1}{2}M_{xp2}\right) \end{bmatrix} \quad (8)$$

Modification of Driver 4

Figure 12:
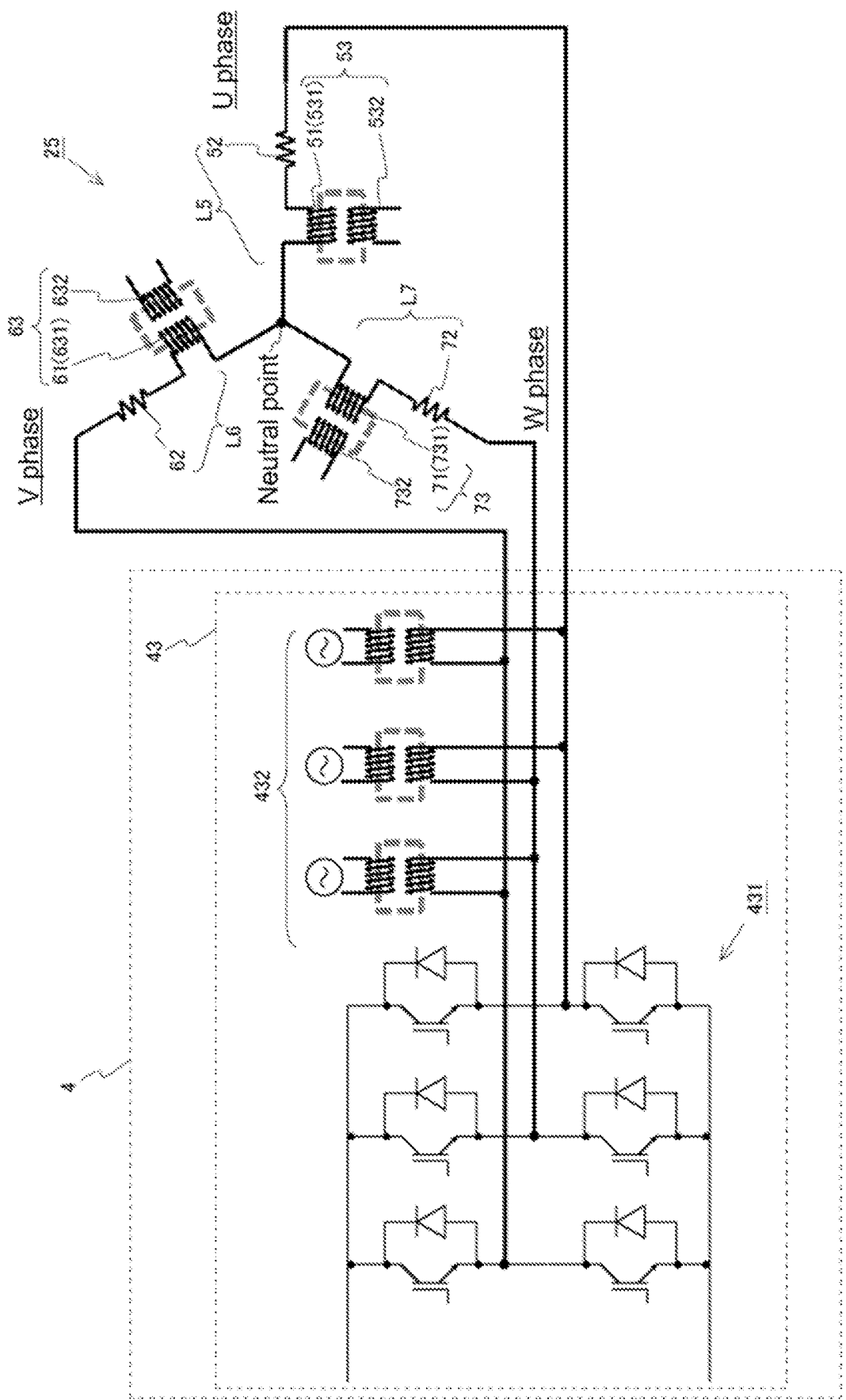
FIG. 12 is a diagram of a driver according to a modification.

In the above embodiments, the inverter circuit in the power converter 43 in the driver 4 is used to supply power to the winding unit 25 in the motor 2. More specifically, the driving current generated by the inverter circuit is supplied to the winding unit 25 in the motor 2, and a part of the supplied power is extracted by the extractor 214 for the encoder 22. In the present modification, as shown in FIG. 12, the power converter 43 includes a power superimposition unit 432, separate from an inverter circuit 431, to supply power. Although the winding unit 25 shown in FIG. 12 corresponds to the winding unit 25 in the example of FIG. 5, the winding unit 25 in the present modification may be replaced with the winding unit 25 in the example of FIG. 3 or FIG. 5.

The inverter circuit 431 includes, between a positive power line and a negative power line, a U-phase leg, a V-phase leg, and a W-phase leg connected in parallel. Each leg has the output connected to the winding portion in the motor 2 for the corresponding phase with the power line. The power converter 43 includes the power superimposition unit 432 connected in parallel to the inverter circuit 431 with the power line, through which the power superimposition unit 432 superimposes power on the driving current for the motor 2 flowing in the winding unit 25. The power superimposition unit 432 allow high-frequency power to be superimposed using the transformers for the U phase, the V phase, and the W phase. This structure allows AC power appropriate for the encoder 22 to be transmitted to the extractor 214, separately from power for operating the motor 2. In another embodiment, the power superimposition unit 432 may be connected in series to the inverter circuit 431.

Modification of Device to which Extracted Power is Supplied

In the above embodiments, the power extracted by the extractor 214 is supplied to the encoder 22. However, the extracted power may be supplied to a device other than the encoder 22. For example, the power may be supplied to a sensor (e.g., a temperature sensor or a vibration sensor) located inside or outside the motor 2. In this case, the motor body 21 may include a port to connect to the sensor with a cable for power supply.

Modification of Power Extraction

Figure 14:
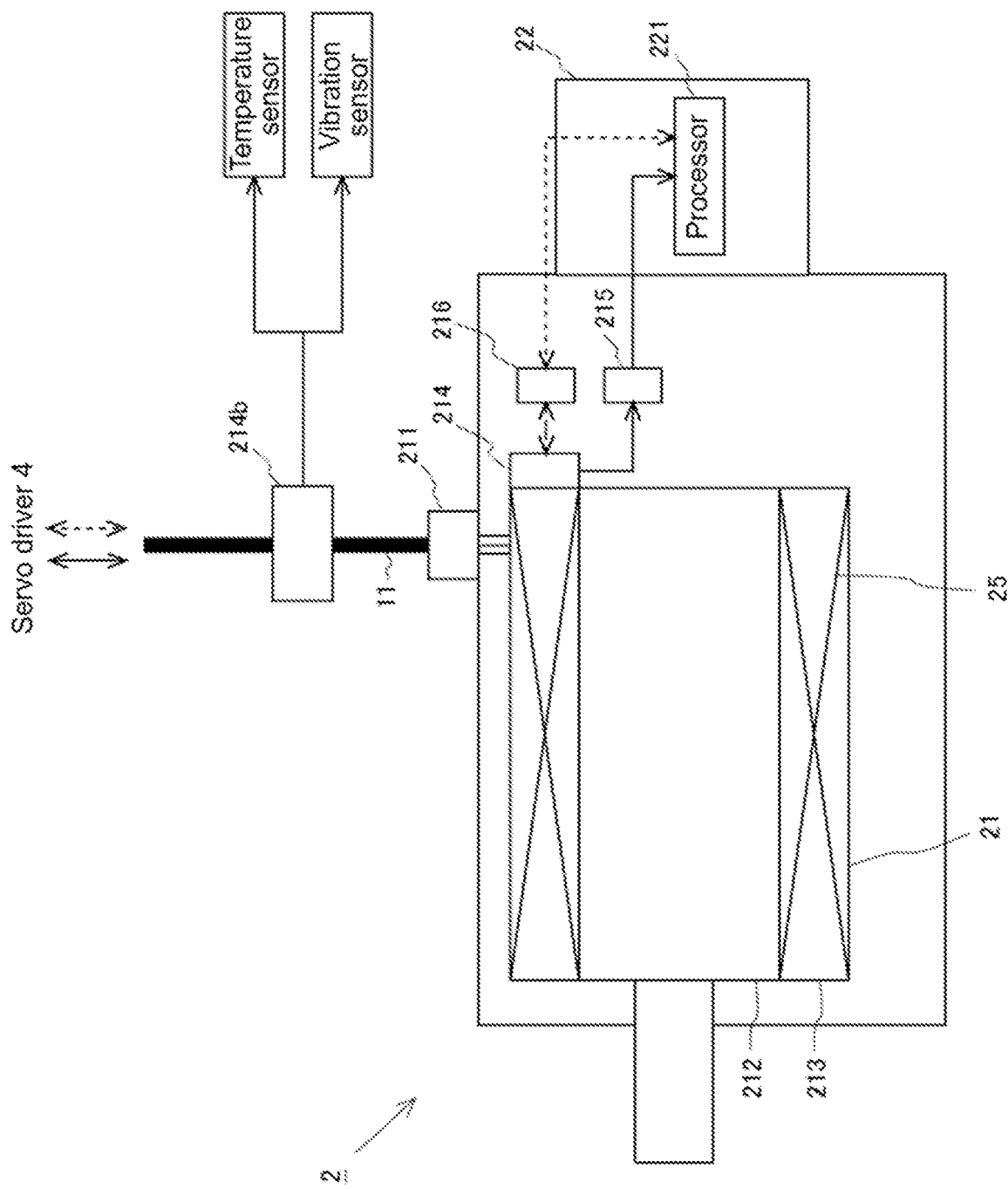
FIG. 14 is a first schematic diagram of a motor according to a modification.

A modification will now be described with reference to FIG. 14. FIG. 14 is a schematic diagram of a motor 2 according to the present modification. Similarly to the example of FIG. 2, the motor 2 in the present modification includes an extractor 214 with transformers located in the winding unit 25. The transformers for the extractor 214 may have substantially the same structure as the transformers shown in FIG. 3, 4, or 7. The structure in the present modification further includes an extractor 214b on the power line 11 connected to the connector 211 to extract power. The extractor 214b extracts power also using transformers electrically identical to the transformers shown in FIG. 3 or FIG. 4 incorporated in the power line 11.

The power extracted by the extractor 214b may be, for example, rectified in a predetermined manner and supplied to a device located outside the motor 2, such as a temperature sensor or a vibration sensor. The extracted power is stored in a secondary battery for stable power supply to, for example, the temperature sensor. In the motor 2 shown in FIG. 14, the power to be supplied to the encoder 22 is extracted by the extractor 214. In some embodiments, the power to be supplied to the encoder 22 may be extracted by the extractor 214b. In some embodiments, the power to be supplied to the encoder 22 may be extracted by both the extractors 214 and 214b. The motor 2 may eliminate the extractor 214, and the encoder 22 may receive power from a built-in battery or from the servo driver 4.

The motor 2 according to one or more embodiments of the present disclosure can extract power from the winding unit 25 and also from the power line 11 and supply the extracted power to, for example, the encoder 22 and an external sensor. This greatly reduces the load for cabling for power supply in the servo system.

Modification of Power Supply and Signal Relay

Figure 15:
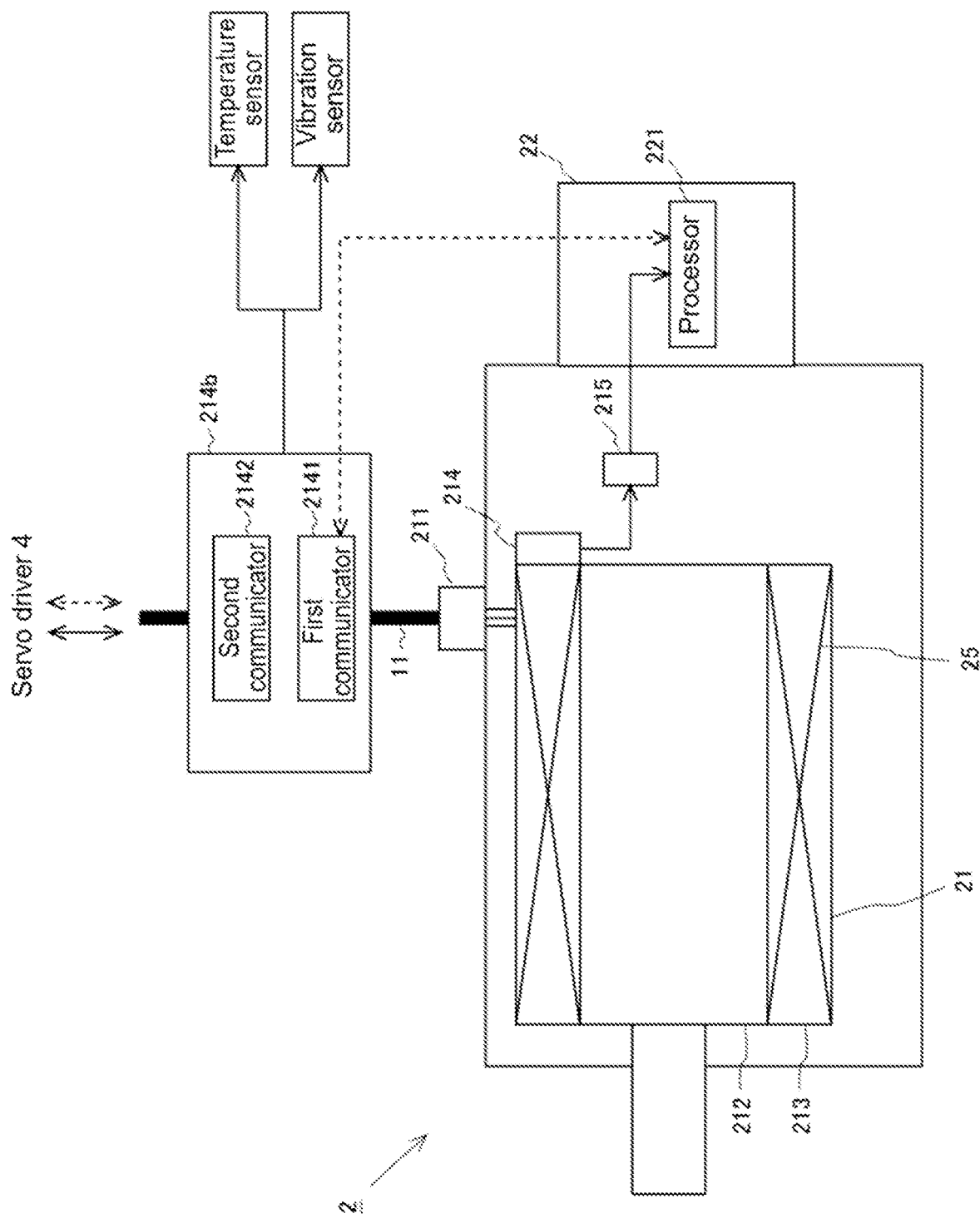
FIG. 15 is a second schematic diagram of a motor according to a modification.

A modification will now be described with reference to FIG. 15. FIG. 15 is a schematic diagram of a motor 2 according to the present modification. In the present modification, the extractor 214b shown in FIG. 14 can communicate with the processor 221 in the encoder 22. The extractor 214b communicates with the processor 221 through wireless communication using power extracted from the power line 11 by the extractor 214b. The processor 221 in the encoder 22 uses power extracted by the extractor 214 and supplied from the motor body 21 with the supply unit 215.

The extractor 214b in the present modification includes a first communicator 2141 and a second communicator 2142. The first communicator 2141 can perform wireless communication with the processor 221. More specifically, the first communicator 2141 can receive a detection signal from the encoder 22 and transmit a signal to the encoder 22 through wireless communication. The first communicator 2141 may use any wireless communication scheme. The extractor 214b includes the transformers for power extraction as described above. The transformers are also used by the second communicator 2142 to serve as an interface to communicate with the servo driver 4. For example, the second communicator 2142 can receive the detection signal from the encoder 22 through the first communicator 2141, and superimpose the detection signal on a current flowing through the power line 11. More specifically, the second communicator 2142 can transmit a signal to the secondary coils in the transformers, obtain a signal output from the primary coils, and superimpose the output signal on the current flowing through the power line 11. The second communicator 2142 is thus used to transmit or receive a signal between the power line 11 and the processor 221 in the encoder 22, and is also used to transmit the signal to the servo driver 4 through the power line 11.

The second communicator 2142 can also receive a predetermined signal from the servo driver 4 through the transformers and transmit the signal to the first communicator 2141, which can then transmit the signal to the processor 221 in the encoder 22 through wireless communication. In other words, the extractor 214b and the processor 221 can communicate with each other.

In this structure, the motor 2 receiving power through the power line 11 supplies a part of the power to the attached encoder 22, and also serves as a repeater for information between the servo driver 4 and the encoder 22. The extractor 214b may be installed at a position on the power line 11 to allow wireless communication with the encoder 22. The extractor 214b is easy to install, with the encoder 22 and the power line 11 both typically located near the motor body 21. The structure in the example of FIG. 15 eliminates cabling for power supply and signal transmission to the encoder 22, thus greatly reducing the workload for constructing the servo system.

In another modification, the extractor 214b may receive a detection signal from a power supply target (e.g., a temperature sensor or a vibration sensor) with the first communicator 2141 through wireless communication, superimpose the received signal on the power line 11 with the second communicator 2142, and transmit the resultant signal to the servo driver 4. The extractor 214b may relay the detection signals from the above sensor and from the encoder 22 to the servo driver 4. The first communicator 2141 may perform wired communication with, for example, the encoder 22 and the sensor.

Appendix 1

A motor (2) to receive power from a driver (4) external to the motor (2) through a power line (11), the motor (2) comprising:
an extractor (214) configured to extract a part of power supplied to the motor (2) from the driver (4); and
a supply unit (215) configured to supply the power extracted by the extractor (214) to an external device (22).

DESCRIPTION OF SYMBOLS 2 motor
4 servo driver
22 encoder
25 winding unit
53, 63, 73 transformer
211 connector (power input unit)
214 extractor
215 supply unit

The invention claimed is:

1. A motor to receive power from a driver external to the motor through a power line, the motor comprising:
an extractor configured to extract a part of power supplied from the driver to the motor;
a supply unit configured to supply the power extracted by the extractor to an external device;
a power input unit configured to allow power from the driver through the power line to be input into a winding unit in the motor; and
a transformer located in the winding unit, the transformer including a primary coil to receive a part of power in the winding unit,
wherein the extractor extracts the part of the power in the winding unit using the transformer, and
wherein the transformer includes the primary coil connected in parallel to a winding portion for at least one phase of one or more phases included in the winding unit, and a secondary coil connected to the supply unit.

2. The motor according to claim 1, wherein
the supply unit includes a secondary battery configured to store the power extracted by the extractor, and supplies power from the secondary battery to the external device.

3. The motor according to claim 1, wherein
the extractor superimposes a predetermined signal on a driving current flowing through the power line connecting the motor and the driver, or extracts a predetermined signal from the driving current flowing through the power line, and
the extractor includes
a first communicator configured to at least transmit or receive the predetermined signal to or from the external device, and
a second communicator configured to perform predetermined communication with the driver through the power line, the predetermined communication being associated with the predetermined signal.

4. A driver for supplying a driving current to the motor according to claim 1, the driver comprising:
an inverter circuit connected to the winding unit, the inverter circuit being configured to supply the driving current to the winding unit; and
a superimposition unit connected to the winding unit to be in series or parallel to the inverter circuit, the superimposition unit being configured to superimpose power on the driving current flowing through the winding unit.

5. The motor according to claim 1, wherein
the external device is an encoder attached to the motor.

6. The motor according to claim 1, wherein
the external device is an encoder attached to the motor, and
the motor further comprises a signal exchanger configured to cause a predetermined signal to be transmitted or received between the winding unit and the encoder using the transformer.

7. A motor to receive power from a driver external to the motor through a power line, the motor comprising:
an extractor configured to extract a part of power supplied from the driver to the motor; and
a supply unit configured to supply the power extracted by the extractor to an external device, wherein
the extractor superimposes a predetermined signal on a driving current flowing through the power line connecting the motor and the driver, or extracts a predetermined signal from the driving current flowing through the power line, and
the extractor includes
a first communicator configured to at least transmit or receive the predetermined signal to or from the external device, and
a second communicator configured to perform predetermined communication with the driver through the power line, the predetermined communication being associated with the predetermined signal.

8. A motor to receive power from a driver external to the motor through a power line, the motor comprising:
an extractor configured to extract a part of power supplied from the driver to the motor;
a supply unit configured to supply the power extracted by the extractor to an external device;
a power input unit configured to allow power from the driver through the power line to be input into a winding unit in the motor; and
a transformer located in the winding unit, the transformer including a primary coil to receive a part of power in the winding unit,
wherein the extractor extracts the part of the power in the winding unit using the transformer, and
wherein
the external device is an encoder attached to the motor, and
the motor further comprises a signal exchanger configured to cause a predetermined signal to be transmitted or received between the winding unit and the encoder using the transformer.

* * * * *